United States Patent
Yamada et al.

(10) Patent No.: US 8,882,150 B2
(45) Date of Patent: Nov. 11, 2014

(54) BUMP STOPPER

(75) Inventors: Hideto Yamada, Higashi-Hiroshima (JP); Hiroyuki Akaki, Higashi-Hiroshima (JP); Soukichi Kikuchi, Higashi-Hiroshima (JP)

(73) Assignees: Ford Global Technologies, LLC, Dearborn, MI (US); Mazda Motor Corporation, Hiroshima (JP)

( * ) Notice: Subject to any disclaimer, the term of this patent is extended or adjusted under 35 U.S.C. 154(b) by 260 days.

(21) Appl. No.: 13/579,552

(22) PCT Filed: Feb. 18, 2010

(86) PCT No.: PCT/JP2010/001061
§ 371 (c)(1),
(2), (4) Date: Aug. 16, 2012

(87) PCT Pub. No.: WO2011/101907
PCT Pub. Date: Aug. 25, 2011

(65) Prior Publication Data
US 2012/0319336 A1    Dec. 20, 2012

(51) Int. Cl.
*B62D 21/02*      (2006.01)

(52) U.S. Cl.
CPC ...................................... *B62D 21/02* (2013.01)
USPC ....................................................... 280/784

(58) Field of Classification Search
CPC .... B62D 21/02; B60G 7/02; B60G 2204/143; B60R 19/34; B60D 21/11
USPC ........... 280/124.109, 781, 784, 788; 180/232, 180/312; 296/187.09
See application file for complete search history.

(56) References Cited

U.S. PATENT DOCUMENTS

| | | | | |
|---|---|---|---|---|
| 5,431,445 A | * | 7/1995 | Wheatley | 280/784 |
| 6,113,178 A | * | 9/2000 | Faigle | 296/187.06 |
| 6,554,176 B2 | * | 4/2003 | McGill | 228/112.1 |

(Continued)

FOREIGN PATENT DOCUMENTS

| | | |
|---|---|---|
| GB | 2390581 B | 6/2005 |
| JP | 05-193521 | 8/1993 |

(Continued)

OTHER PUBLICATIONS

Japan Institute of Invention and Innovation, Journal of Technical Disclosure No. 2003-504460; Jul. 31, 2003.

(Continued)

*Primary Examiner* — Paul N Dickson
*Assistant Examiner* — Robert A Coker
(74) *Attorney, Agent, or Firm* — Studebaker & Brackett PC

(57) ABSTRACT

In a bump stopper (115) attached to a main frame (10) of a chassis frame (9) of a vehicle (1), a stopper body (116) is a panel which is, as viewed in a cross section along a horizontal direction, formed in a bag shape having an opening on an inner side in a vehicle width direction and formed so as to have openings at upper and lower ends. The stopper body (116) is attached to an outer surface of the main frame (10) at front and rear attachment parts (116c, 116d) which are end parts of the panel positioned at sides of the opening on the inner side in the vehicle width direction. A contact member (118) contacting an arm (92) is attached to the stopper body (116) so as to be positioned in the vicinity of a lower opening (116) of the stopper body (116).

16 Claims, 25 Drawing Sheets

(56) References Cited

U.S. PATENT DOCUMENTS

| | | | |
|---|---|---|---|
| 6,695,393 B1 * | 2/2004 | Aouadi et al. | 296/187.09 |
| 2006/0066090 A1 | 3/2006 | Jennings et al. | |

FOREIGN PATENT DOCUMENTS

| | | |
|---|---|---|
| JP | 2525146 | 11/1996 |
| JP | 3070359 | 5/2000 |
| JP | 4094782 | 3/2008 |
| JP | 4344060 | 7/2009 |
| WO | 2004/002808 A1 | 1/2004 |

OTHER PUBLICATIONS

International Search Report; PCT/JP2010/001061; Apr. 13, 2010.

* cited by examiner

BUMP STOPPER

TECHNICAL FIELD

The present invention belongs to a technical field relating to a bump stopper configured to contact an aim (lower arm) of a front wheel suspension device of a vehicle and restrict upward movement of the arm.

BACKGROUND ART

Conventionally, a ladder shaped chassis frame is provided in a small truck or a vehicle called a "sport-utility vehicle (SUV)" as described in, e.g., Patent Documents 1 and 2. The chassis frame is formed in the ladder shape by a pair of right and left main frames (also called "side frames") extending in a vehicle length direction (vehicle longitudinal direction) and a plurality of cross-members each connecting the main frames together.

An engine mount bracket to which an engine is attached a cab-mount bracket to which vehicle body members forming a cabin in which a passenger(s) rides, etc. are provided on each of the main frames.

In general, an arm (lower arm) is provided in a front wheel suspension device of the vehicle, and a base end part of the arm is attached to the cross-member. A bump stopper configured to contact the arm and restrict upward movement of the arm nay be provided at the same position of the main frame as that of the cross-member in the vehicle length direction or in the vicinity thereof.

CITATION LIST

Patent Document

PATENT DOCUMENT 1: British Patent Publication No. 2390581
PATENT DOCUMENT 2: International Publication No 2004/002808

SUMMARY OF THE INVENTION

Technical Problem

If the bump stopper is provided on the main frame as described above, the bump stopper generally has a certain thickness in the vehicle length direction. Thus, there is a possibility that, upon a frontal collision of the vehicle, the bump stopper prevents compression deformation of the main frame in the vehicle length direction. This is disadvantageous to absorption of collision energy by the compression deformation of the main frame.

The present invention has been made in view of the foregoing, and it is an objective of the present invention to, if a bump stopper is provided on a main frame, absorb collision energy as much as possible by compression deformation of the main frame in a vehicle length direction without the bump stopper preventing the compression deformation of the main frame in the vehicle length direction upon a frontal collision of a vehicle.

Solution to the Problem

In order to accomplish the foregoing objective, the present invention is intended for a bump stopper attached to a main frame of a chassis frame of a vehicle extending in a vehicle length direction, contacting an arm of a front wheel suspension device of the vehicle, and restricting upward movement of the arm. The bump stopper includes a stopper body attached to an outer surface of the main frame in a vehicle width direction so as to protrude toward an outer side in the vehicle width direction. The stopper body is a panel which is, as viewed in a cross section along a horizontal direction, formed in a bag shape having an opening on an inner side in the vehicle width direction and formed so as to have openings at upper and lower ends, and the stopper body is attached to the outer surface of the main frame in the vehicle width direction at front and rear attachment parts which are end parts of the panel positioned at sides of the opening on the inner side in the vehicle width direction such that the end parts are apart from each other in the vehicle length direction. A contact member contacting the arm is attached to the stopper body so as to be positioned in a vicinity of a lower opening which is the opening at the lower end of the panel.

According to the foregoing configuration, since the stopper body is the panel which is, as viewed in the cross section along the horizontal direction, formed in the bag shape having the opening the inner side in the vehicle width direction, the bump stopper (stopper body) is easily compressed and deformed in the vehicle length direction upon a frontal collision of the vehicle, and is less likely to prevent compression deformation of the main frame in the vehicle length direction. Thus, even if the bump stopper is provided in the main frame, the amount of compression deformation of the main frame in the vehicle length direction can be ensured.

It is preferred for the bump stopper that the contact member is attached to the stopper body through a closing member covering the lower opening of the stopper body.

Thus, when the arm comes into contact with the contact member, the contact member can stably receive force from the arm.

It is preferred for the bump stopper that, at a position of the main frame overlapping, in the vehicle length direction, with an upper opening which is the opening at the upper end of the panel, a weak part configured to facilitate deformation of the main frame in the vehicle length direction upon a frontal collision of the vehicle is provided.

Thus, upon the frontal collision of the vehicle, it can be ensured that the main frame is more easily compressed and deformed in the vehicle length direction at a connection part of the main frame and the bump stopper.

It is preferred for the bump stopper that an amount of outward protrusion of the stopper body from the main frame in the vehicle width direction is increased toward a bottom of the stopper body.

Thus, the protrusion amount decreased toward the top of the stopper body allows the high strength of the bump stopper against force received from the arm. In addition, an opening, area of the lower opening (i.e., the area of a lower surface of the closing member) can be increased, and therefore the area of contact between the contact member and the arras can be ensured. Thus, while a function of the bump stopper is maintained, the bump stopper can be easily compressed and deformed in the vehicle length direction upon the frontal collision of the vehicle.

It is preferred for the bump stopper that the chassis frame includes a cross-member extending in the vehicle width direction in a vicinity of the front wheel suspension device, an engine mount bracket is attached to the main frame, the cross-member and the engine mount bracket are attached to the main frame so as to be apart from each other on the main frame, and one or both of the front and rear attachment parts of the stopper body is attached to the main frame at a position which does not overlap with the cross-member and the engine mount bracket in the vehicle length direction.

Thus, the cross-member, the engine mount bracket, and the bump stopper are dispersively arranged in the vehicle length direction on the main frame, and therefore the amount of compression deformation of the main frame in the vehicle length direction can be ensured.

One of the front and rear attachment parts of the stopper body may be attached to the main frame at the position which does not overlap with the cross-member and the engine mount bracket in the vehicle length direction. The other one of the front and rear attachment parts of the stopper body may overlap with the cross-member in the vehicle length direction and may be attached to the main frame and the cross-member.

This ensures the amount of compression deformation of the main frame in the vehicle length direction, and enhances the stiffness of the bump stopper in the vertical direction. Thus, the bump stopper can have the high strength against force received from the arm.

It is preferred for the bump stopper that the arm is branched apart in the vehicle length direction at a base end part thereof, the chassis frame includes a cross-member attached to a rear base end part of the arm and extending in the vehicle width direction, an engine mount bracket is attached to an inner surface of the main frame in the vehicle width direction so as to be apart from the cross-member in front thereof, the rear attachment part of the stopper body is attached to the outer surface of the main frame in the vehicle width direction at a position overlapping with the cross-member in the vehicle length direction, and the front attachment part of the stopper body is attached to the outer surface of the main frame in the vehicle width direction at a position between the engine mount bracket and the cross-member in the vehicle length direction.

Thus, upon the frontal collision of the vehicle, the main frame is, together with the bump stopper, compressed and deformed in the vehicle length direction at part of the main frame between the engine mount bracket and the cross-member. Consequently, the amount of compression deformation of the main frame in the vehicle length direction can be ensured.

It is preferred for the bump stopper that the front and rear attachment parts of the stopper body are attached to parts extending an upper end to a lower end at the outer surface of the main frame in the vehicle width direction.

This ensures the attachment strength of the bump stopper to the main frame, and therefore the bump stopper can withstand force received from the arm.

Another aspect of the present invention is intended for a bump stopper contacting an arm of a front wheel suspension device of a vehicle and restricting upward movement of the arm. The bump stopper includes a stopper body formed in a substantially U-shape as viewed in a cross section along a horizontal direction. The stopper body is attached to a main frame of the vehicle extending in a vehicle length direction, at end parts of the U-shape as viewed in the cross section, and an upper opening is formed between an upper end part of the stopper body and the main frame.

According to the foregoing configuration, the bump stopper is easily compressed and deformed in the vehicle length direction upon the frontal collision of the vehicle, and therefore does not prevent the compression deformation of the main frame in the vehicle length direction. Thus, the amount of collision energy absorbed by the compression deformation of the main frame in the vehicle length direction can be ensured.

In the another aspect of the present invention, it is preferred that a lower opening is formed between a lower end part of the stopper body and the main frame.

This allows the bump stopper to be more easily compressed and deformed in the vehicle length direction upon the frontal collision of the vehicle.

The lower opening may be closed by a closing member, and a contact member contacting the arm may be attached to the closing member. This facilitates installment of the contact member. In addition, when the arm comes into contact with the contact member, the contact member can stably receive force from the arm.

Advantages of the Invention

As described above, according to the bump stopper of the present invention, in, the case where the bump stopper is provided on the main frame, the bump stopper is configured not to prevent the compression deformation of the main frame in the vehicle length direction upon the frontal collision of the vehicle. Thus, the amount of collision energy absorbed by the compression deformation of the main frame in the vehicle length direction can be ensured.

DESCRIPTION OF EMBODIMENTS

An embodiment of the present invention will be described below in detail with reference to drawings.

Figure 1:
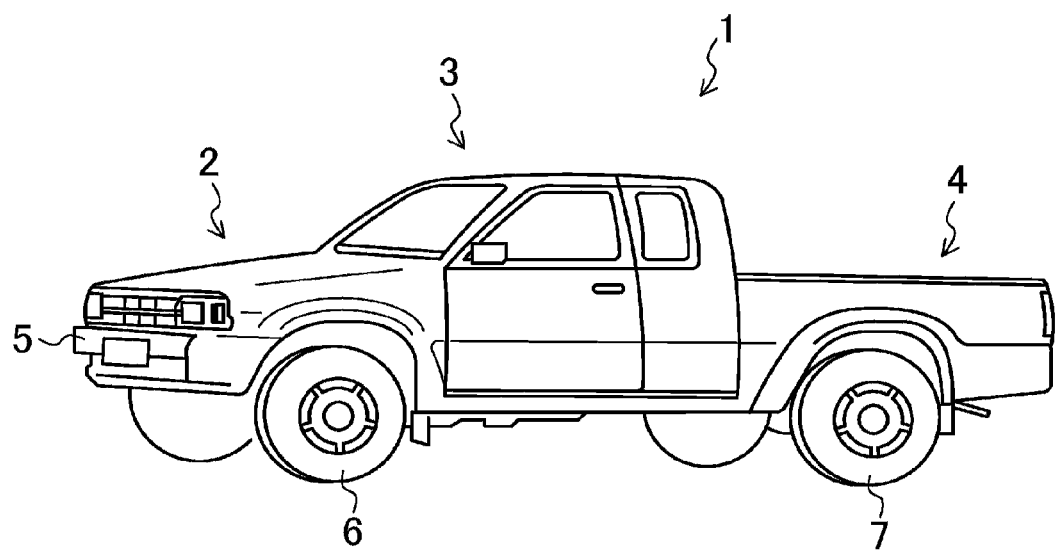
FIG. 1 is a perspective view illustrating the entirety of a vehicle for which a frontal collision energy absorption structure of an embodiment of the present invention is employed.
Figure 2:
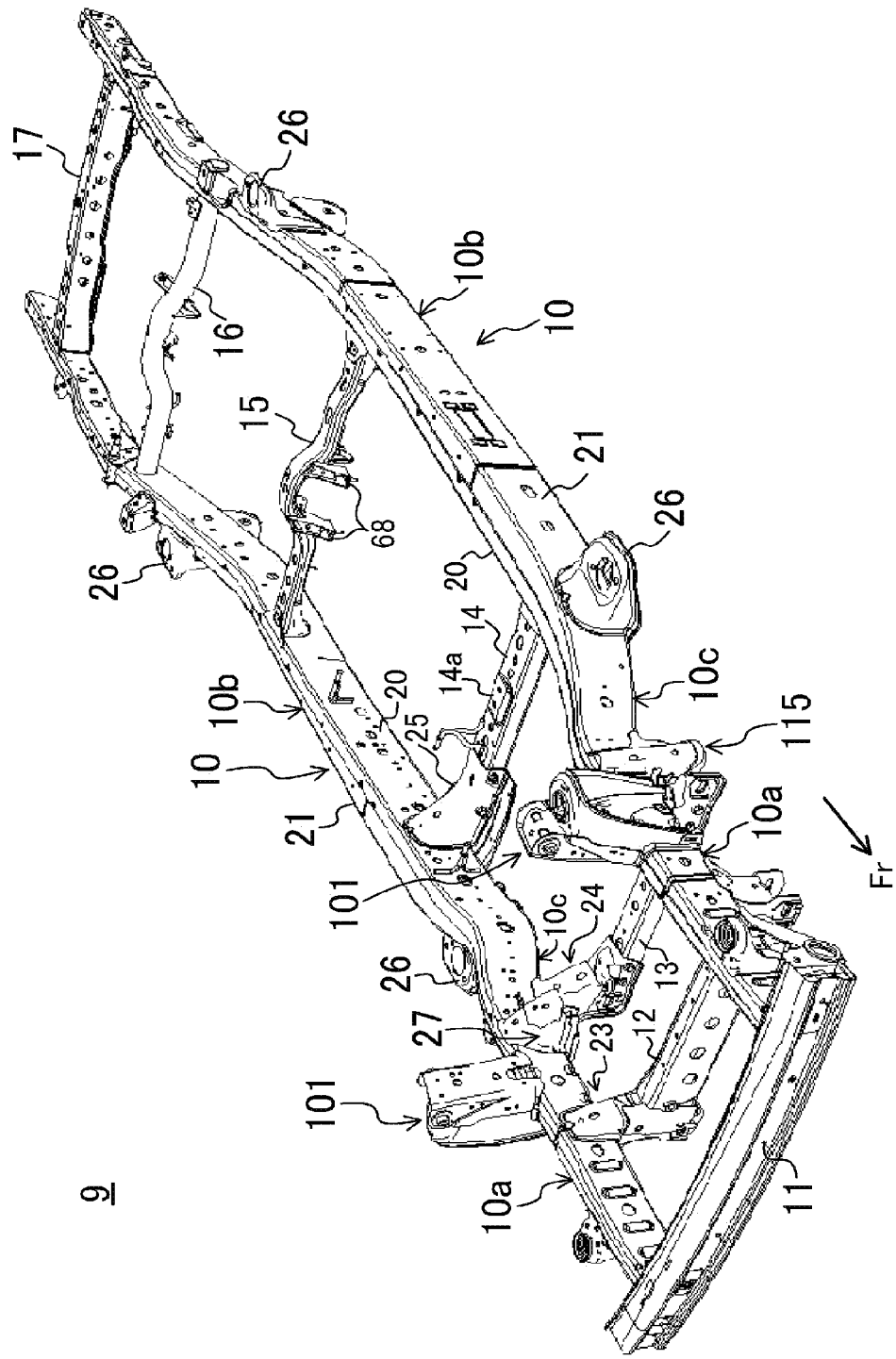
FIG. 2 is a perspective view of the entirety of a chassis frame of the vehicle diagonally from an upper left front side of the vehicle.
Figure 3:
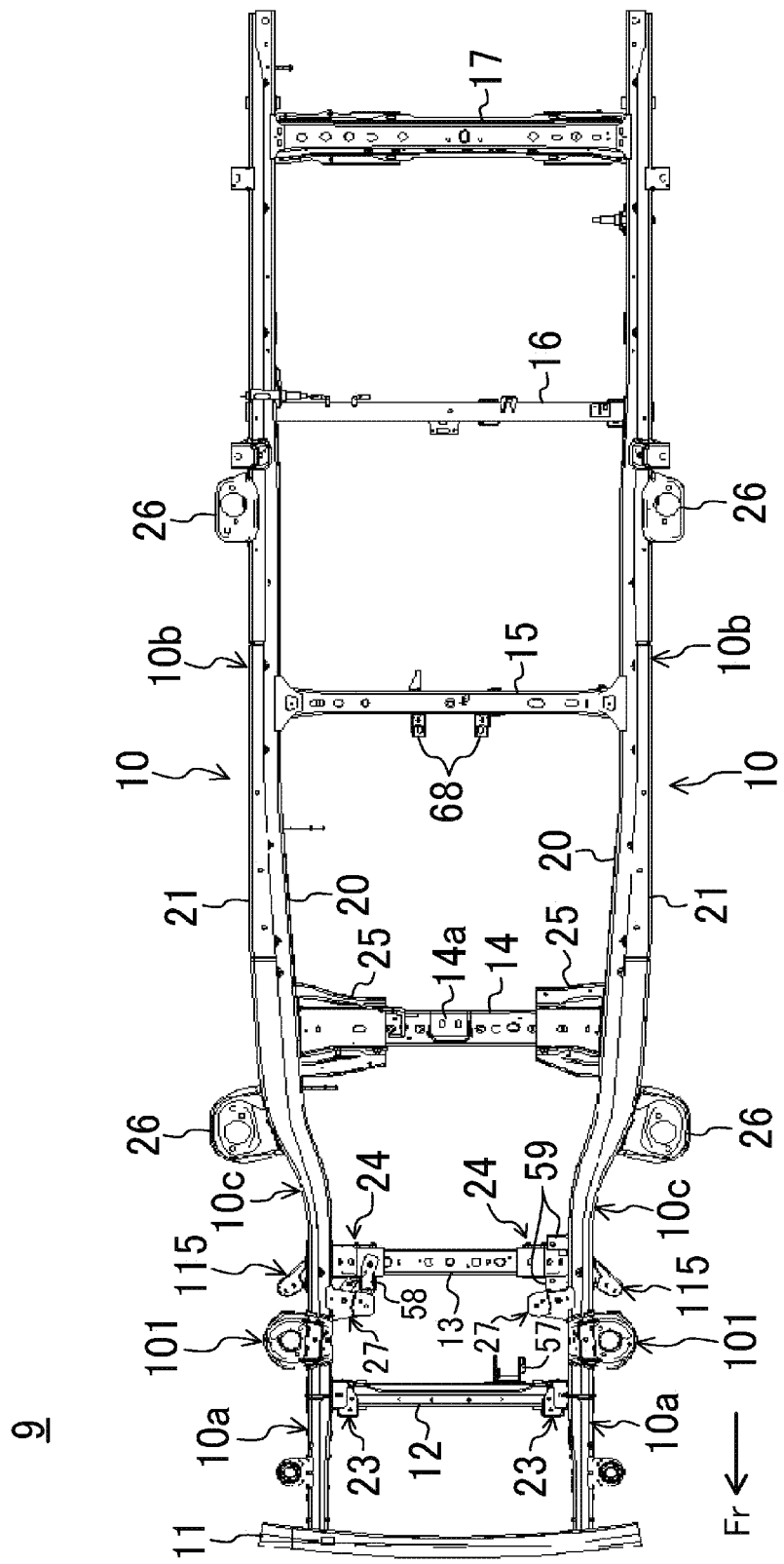
FIG. 3 is a plan view of the chassis frame.
Figure 4:
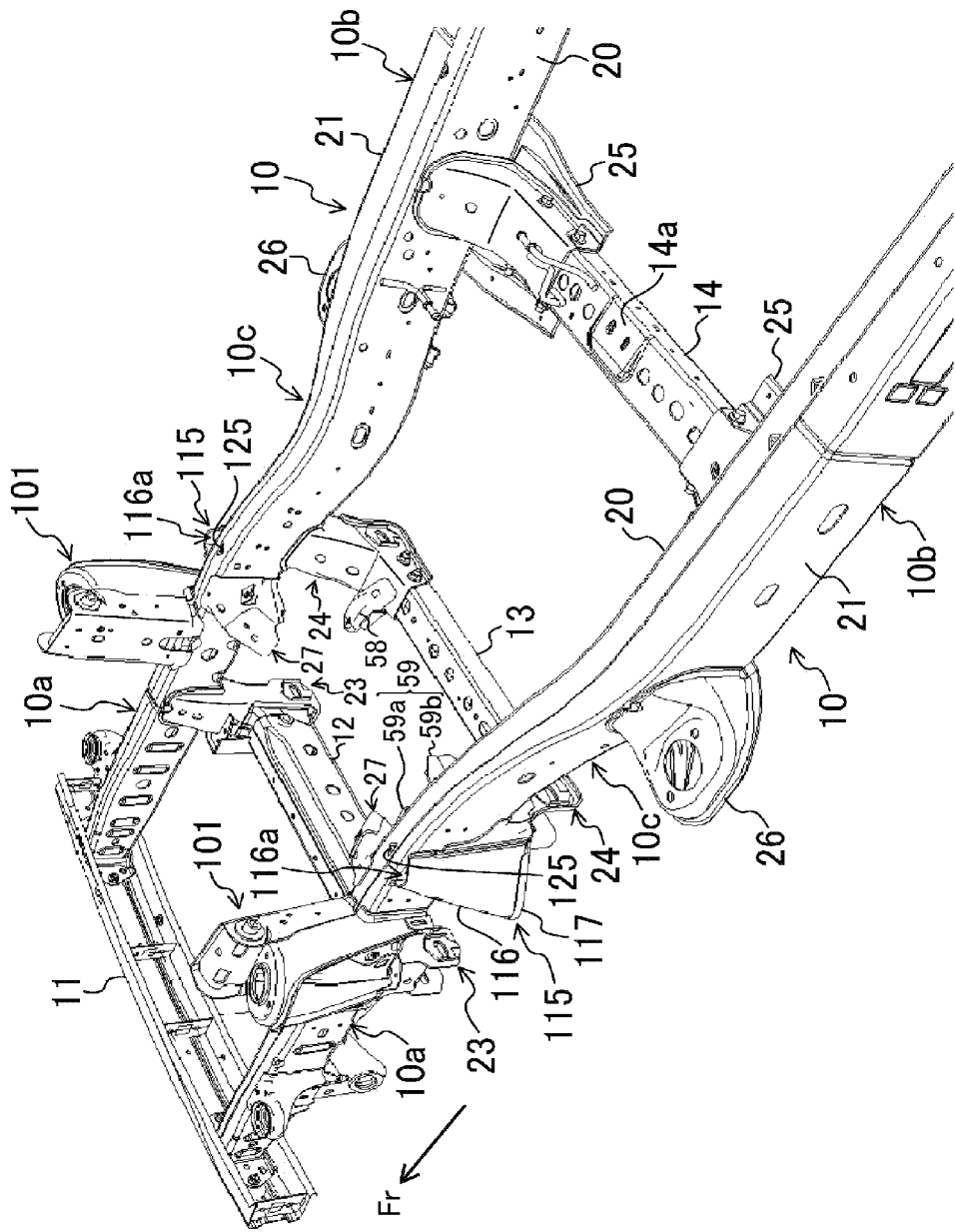
FIG. 4 is a perspective view of a front part of the chassis frame diagonally from an upper left rear side of the vehicle.
Figure 5:
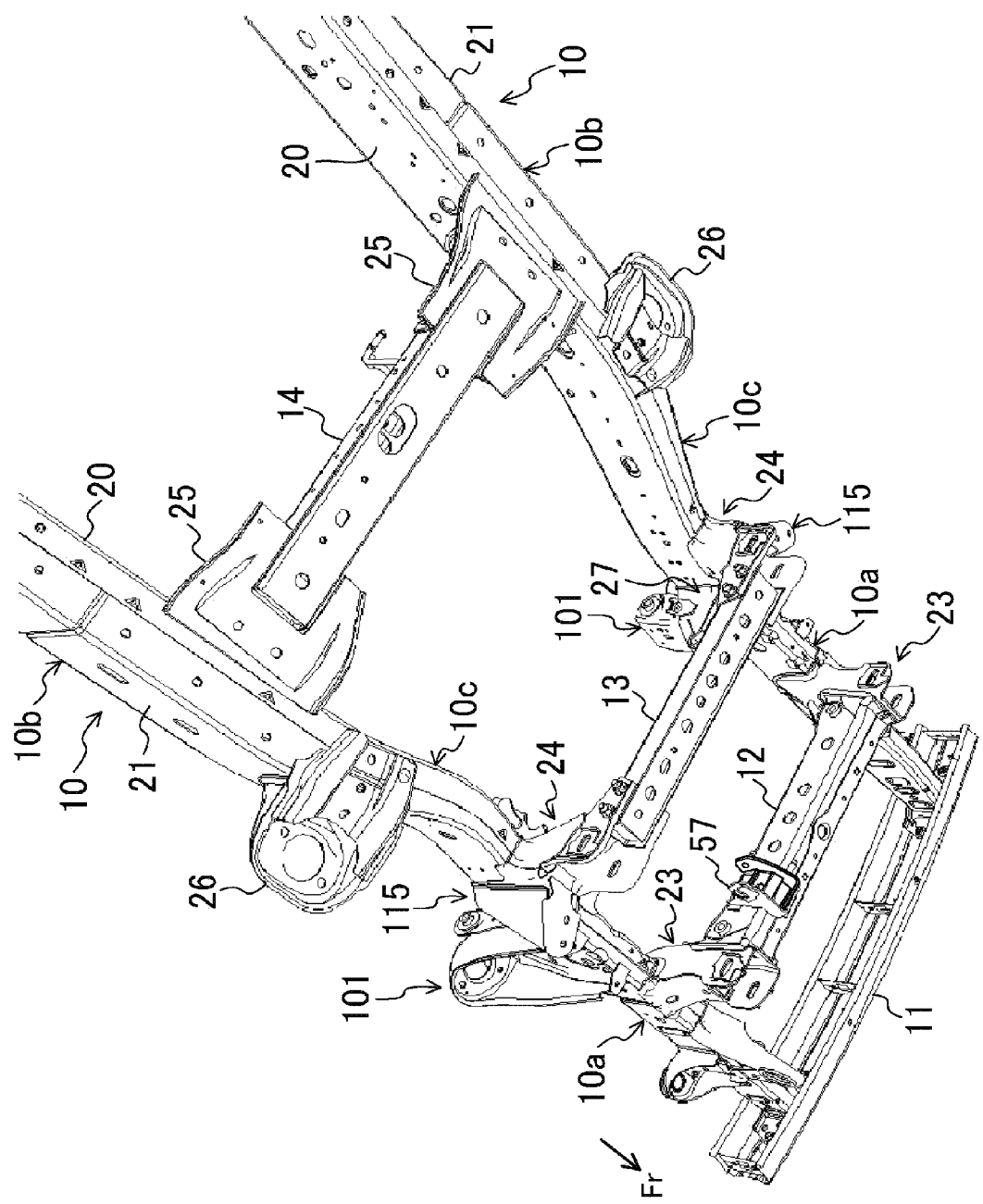
FIG. 5 is a perspective view of the front part of the chassis frame diagonally from a lower left rear side of the vehicle.
Figure 6:
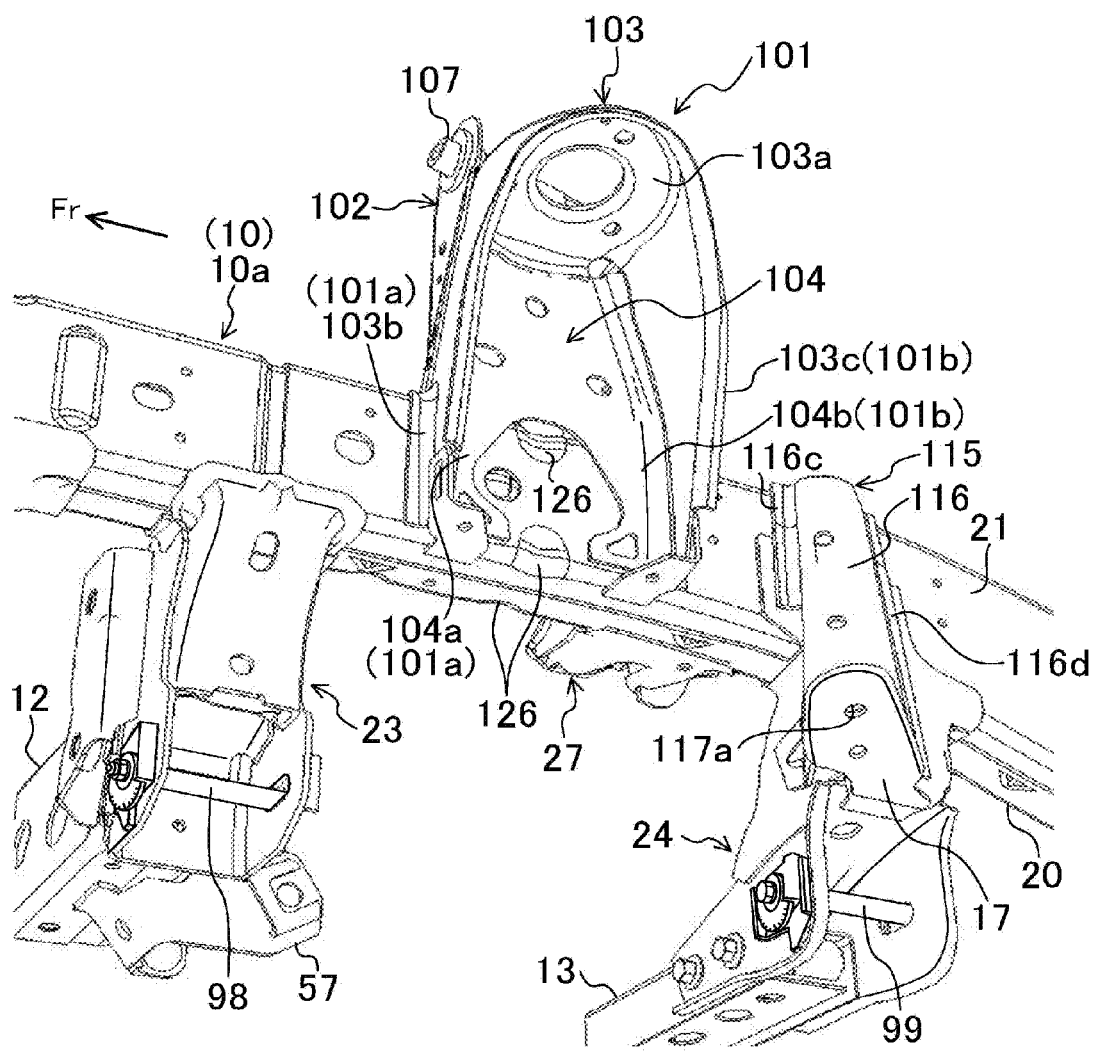
FIG. 6 is a perspective view illustrating the vicinity of a suspension tower in an outer part of a left main frame of the chassis frame in a vehicle width direction.
Figure 7:
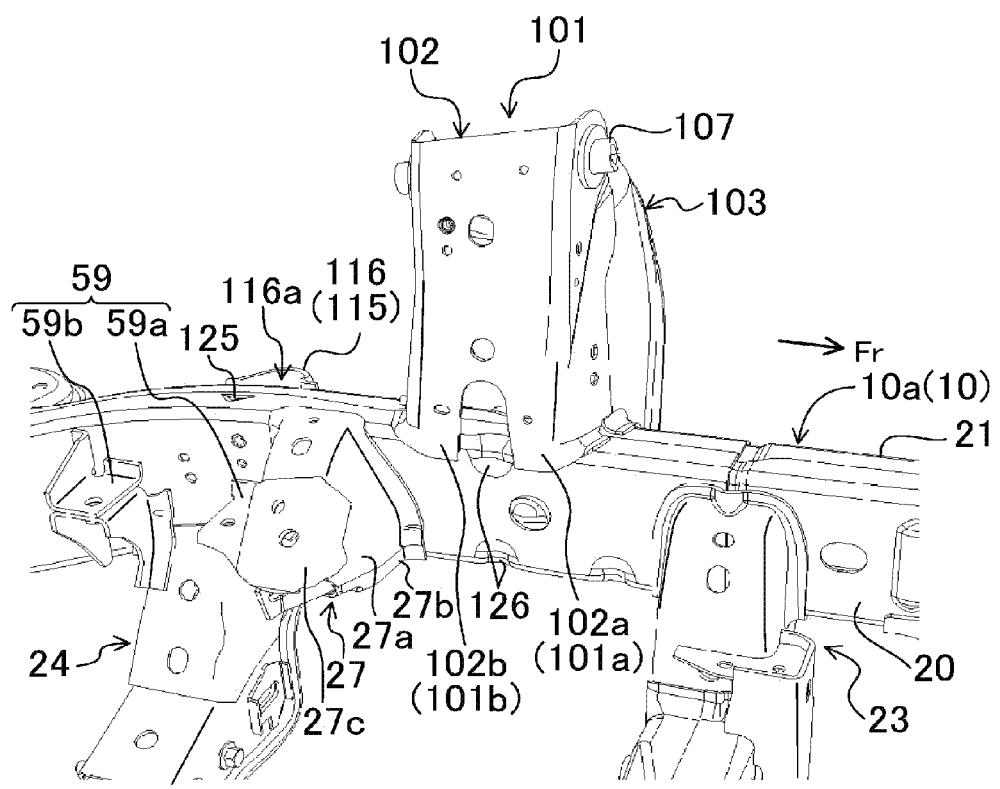
FIG. 7 is a perspective view illustrating the vicinity of the suspension tower in an inner part of the left main frame of the chassis frame in the vehicle width direction.
Figure 8:
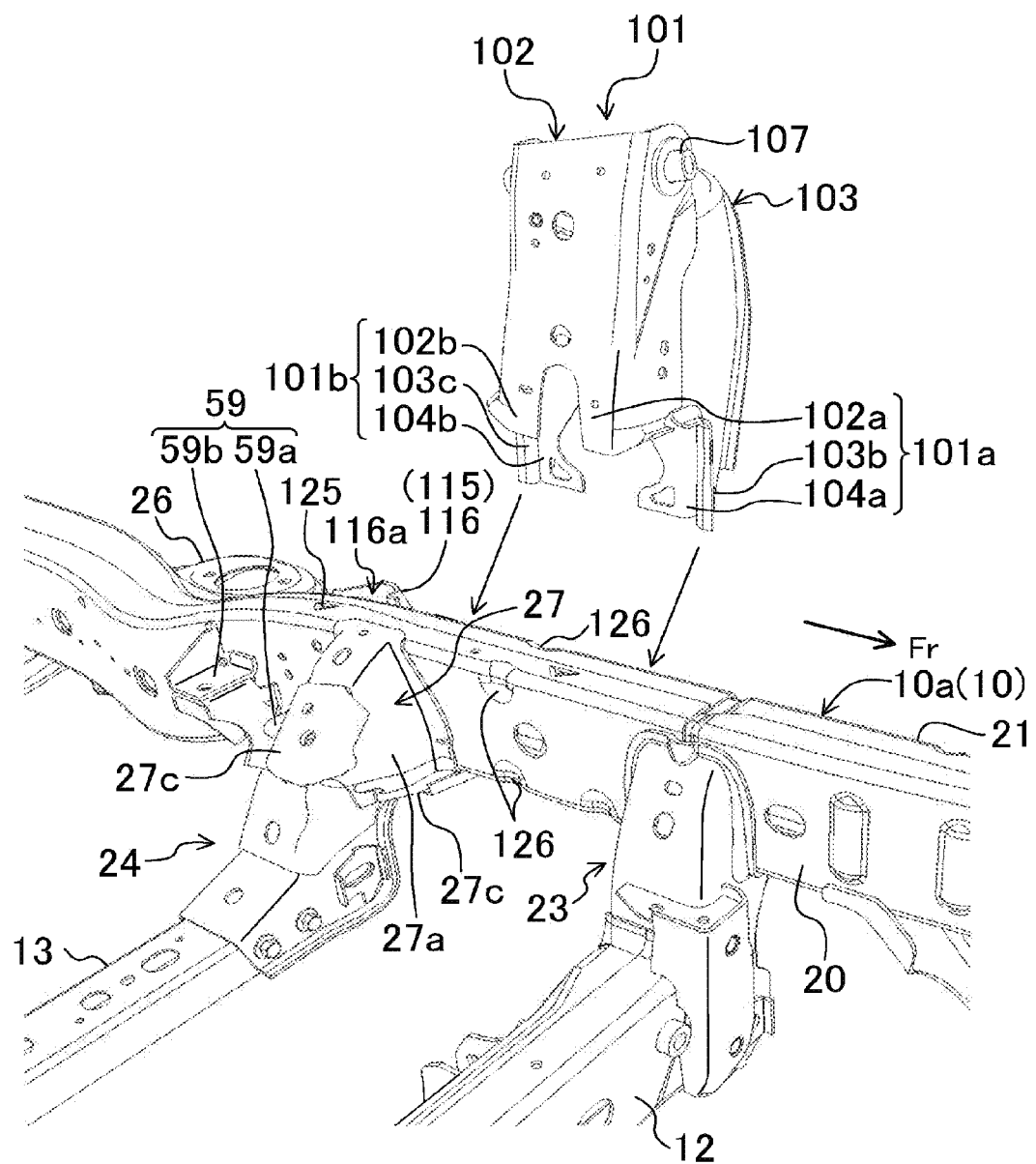
FIG. 8 is an exploded perspective view illustrating the vicinity of the suspension tower in the inner part of the left main frame of the chassis frame in the vehicle width direction.
Figure 9:
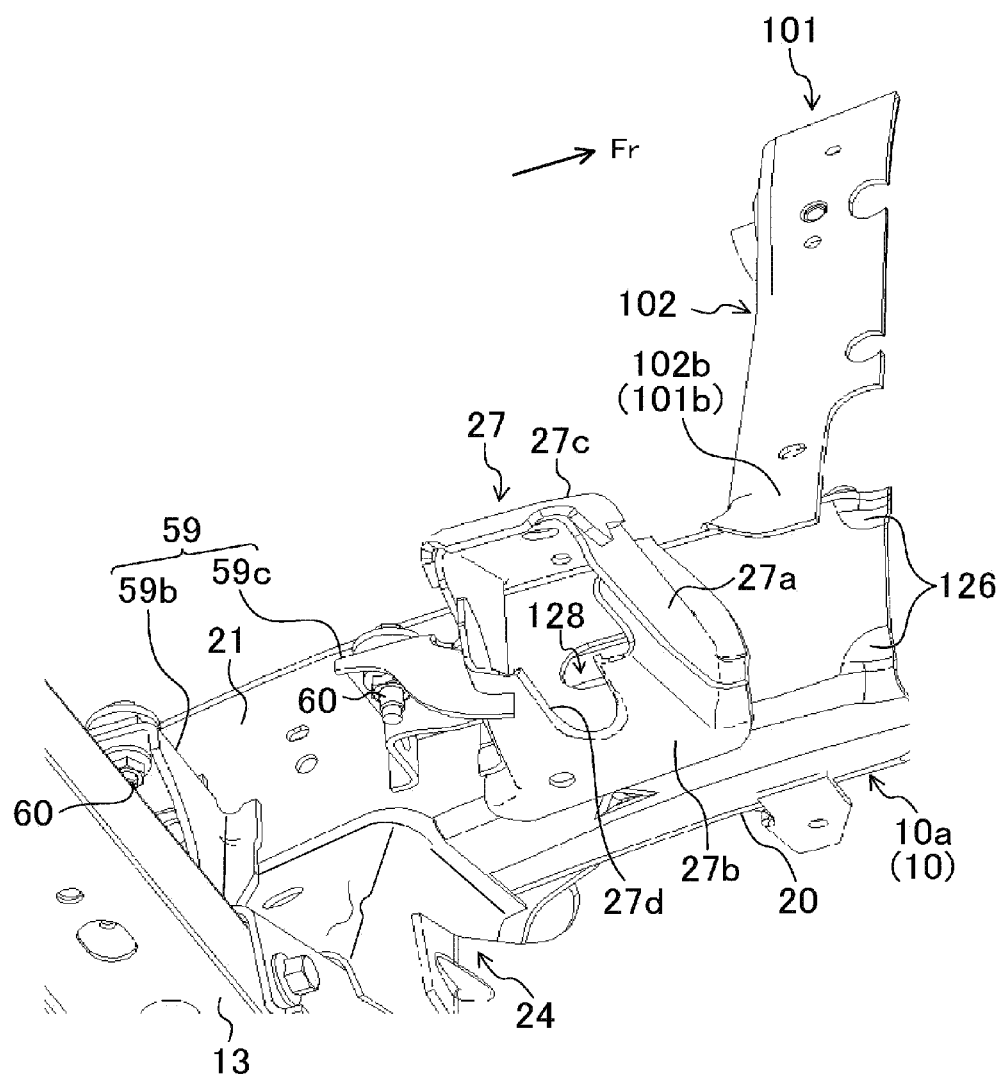
FIG. 9 is a perspective view illustrating the vicinity of an engine mount bracket in the inner part of the left main frame of the chassis frame in the vehicle width direction.

FIG. 1 illustrates the entirety of a vehicle 1 (in the present embodiment, a small truck) for which a frontal collision energy absorption structure of the embodiment of the present invention is employed. FIGS. 2-12 illustrate the entirety or part of a chassis frame 9 of the vehicle 1, and FIGS. 13-24 illustrate the state in which various components (including units) are mounted on the chassis frame 9.

Figure 13:
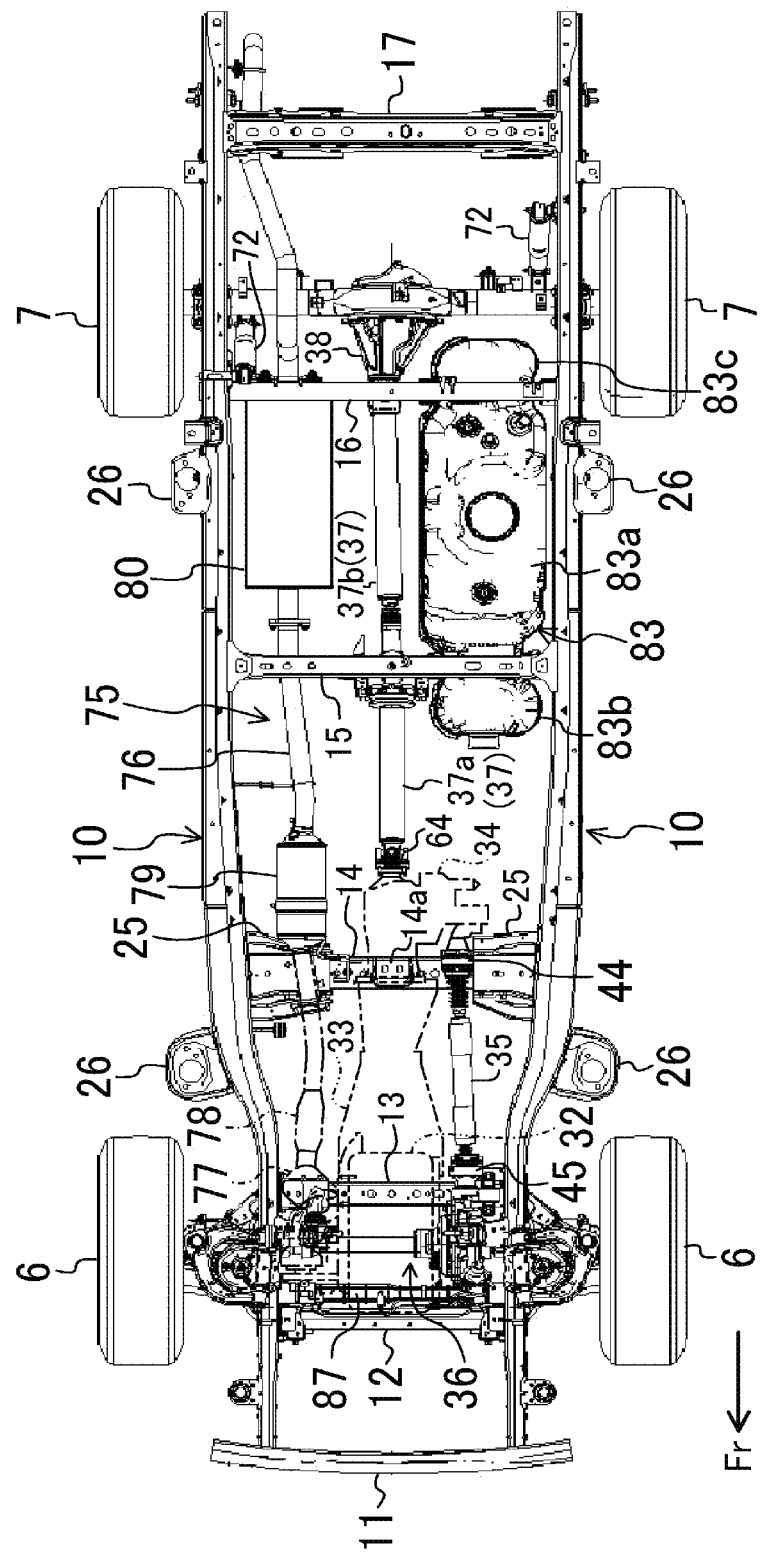
FIG. 13 is a plan view illustrating the state in which various components (including units) are mounted on the chassis frame.
Figure 14:
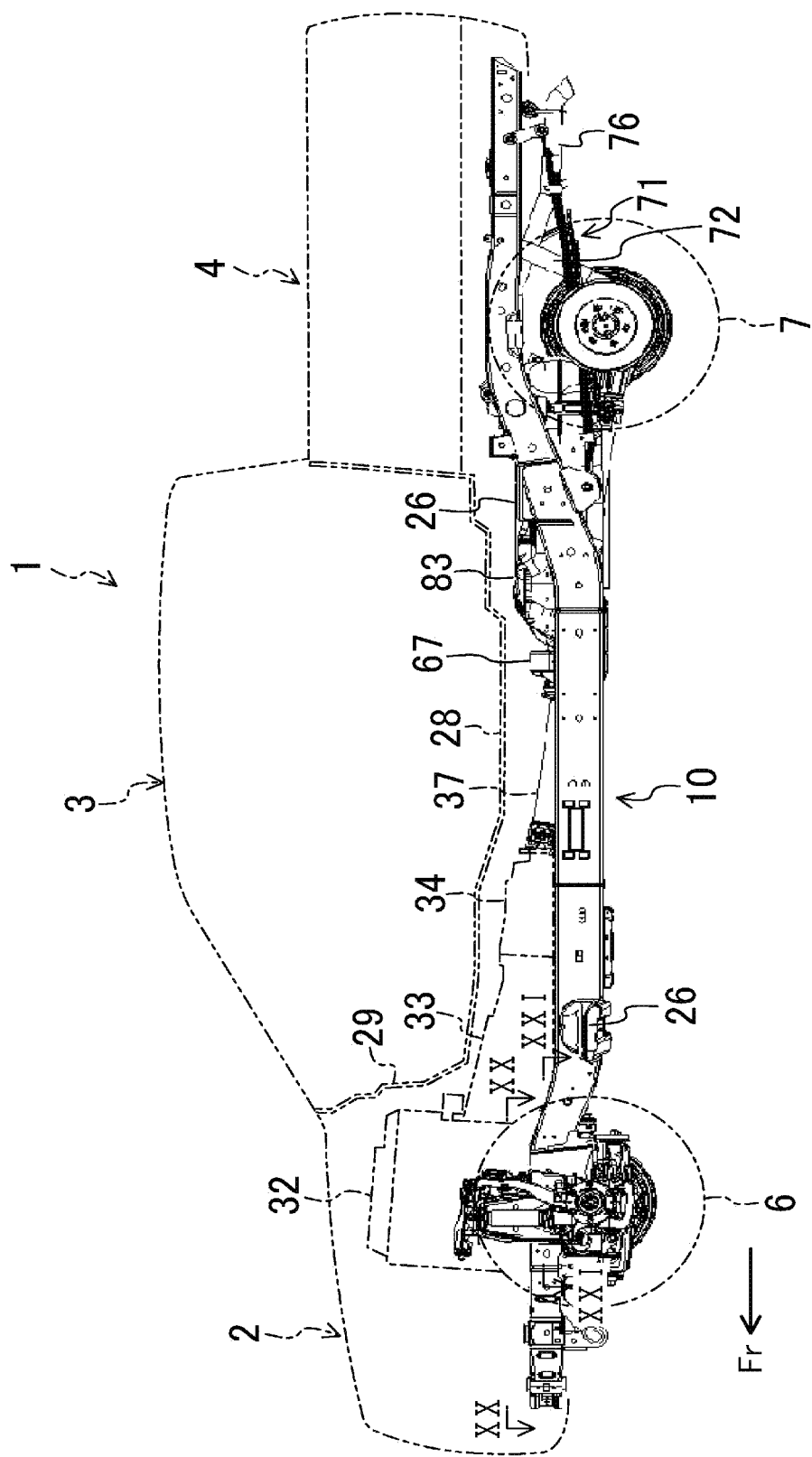
FIG. 14 is a side view of the component-mounted chassis frame from a left side of the vehicle.

Referring to FIGS. 1 and 14, the vehicle 1 includes, in this order from the front thereof, an engine room 2, a cabin 3, and a deck 4. The front, rear, left, and right of the vehicle 1 are hereinafter simply referred to as "front," "rear," "left," and "right." Note that, in FIGS. 2-18, 20-22, and 24, the front side of the vehicle 1 is represented by "Fr."

The vehicle 1 includes the chassis frame 9 in a lower part thereof. The chassis frame 9 includes a pair of right and left main frames (also called side frames) 10 extending in a vehicle length direction (longitudinal direction), and a plurality of cross-members (in the present embodiment, first to seventh cross-members 11-17 are provided in this order from the front) each connecting the main frames 10 together and extending in a vehicle width direction. The chassis frame 9 is in a ladder shape as viewed in the plane. Each of the main frames 10 includes an inner panel 20 arranged on an inner side in the vehicle width direction, and an outer panel 21 arranged on an outer side in the vehicle width direction. The main frame 10 is in a substantially rectangular shape as viewed in a cross section. A closed space is formed between the panels 20, 21 as viewed in the cross section.

The first cross-member 11 is attached to front ends of the main frames 10, and functions as a bumper reinforcement configured to reinforce a front bumper 5 (see FIG. 1). The second cross-member 12 is, at both end parts thereof, attached to the right and left main frames 10 through cross-member brackets 23 welded respectively to the right and left main frames 10. The third cross-member 13 is also, at both end parts thereof, attached to the right and left main frames 10 through cross-member brackets 24 welded respectively to the right and left main frames 10. The cross-member brackets 23 are considered as part of the second cross-member 12, and the cross-member brackets 24 are considered as part of the third cross-member 13. The fourth cross-member 14 is, at both end parts thereof, attached to the right and left main frames 10 through large gussets 25 welded respectively to the right and left main frames 10. The gussets 25 serve as brackets and reinforcements, and are considered as part of the fourth cross-member 14. Each of the fifth to seventh cross-members 15-17 is, at both end parts thereof, attached directly to the right and left main frames 10.

Each of the main frames 10 includes the following: a narrow part 10a positioned in an end part of the main frame 10 in the vehicle width direction below the engine room 2 such that a distance between the narrow parts 10a of the main frames 10 is short; a wide part 10b positioned below the cabin 3 and the deck 4 such that a distance between the wide parts 10b of the main frames 10 is longer than that between the narrow parts 10a; and a widened part 10c positioned between the narrow part 10a and the wide part 10b (in a rear end part of the engine room 2) such that a distance between the widened parts 10c of the main frames 10 is increased toward the rear (see FIG. 14 for a positional relationship among the parts 10a, 10b, 10e of the main frame 10, the engine room 2, the cabin 3, and the deck 4). The width (i.e., the cross-sectional area) of the wide part 10b itself is larger than the width (i.e., the cross-sectional area) of the narrow part 10a itself. The widened part 10c extends from a rear end of the narrow part 10a (the vicinity of a rear side of the third cross-member 13) toward the rear so as to be inclined toward the outer side in the vehicle width direction. The width (cross-sectional area) of the widened part 10c itself is increased toward the rear. The widened part 10c is connected to a front end of the wide part 10b (the vicinity of a front side of the fourth cross-member 14). Thus, the widened parts 10c of the main frames 10 and the third and fourth cross-members 13, 14 are together formed in a trapezoidal shape as viewed in the plane.

The wide part 10b is formed so as to have the maximum width (cross-sectional area) in a connection part of the wide part 10b and the fourth cross-member 14 and the vicinity thereof. The width (cross-sectional area) of the wide part 10b is gradually decreased from the fourth cross-member 14 to the sixth cross-member 16, and is substantially uniform in part of the wide part 10b from the sixth cross-member 16 toward the rear. As described above, the fourth cross-member 14 is connected to part of the wide part 10b where the width (cross-sectional area) thereof is large, and the connection part of the wide part 10b and the fourth cross-member 14 is reinforced by the large gusset 25.

Part of the wide part 10b of the main frame 10 below the cabin 3 is at a height position lower than the narrow part 10a, and the widened part 10c is downwardly inclined toward the rear. In addition, part of the wide part 10b of the main frame 10 below the deck 4 (part of the wide part 10b from the sixth cross-member 16 toward the rear) is at a height position higher than part of the wide part 10b below the cabin 3, and part of the wide part 10b below the cabin 3 is, at a rear part thereof, upwardly inclined toward the rear (see FIG. 14).

A cab-mount bracket 26 is attached to the widened part 10c of the main frame 10 in the vicinity of the front side of the fourth cross-member 14, and another cab-mount bracket 26 is attached to the wide part 10b of the main frame 10 in the vicinity of a front side of the sixth cross-member 16. Vehicle body members forming the cabin 3 are mounted on each of the cab-mount brackets 26 through a cab mount including a rubber member. Each of the cab-mount brackets 26 is welded to an outer surface of the main frame 10 in the vehicle width direction and to a lower surface of the main frame 10.

Of the vehicle body members forming the cabin 3, a vehicle body member forming a floor of the cabin 3 is a floor panel 28 and another vehicle body member partitioning between the engine room 2 and the cabin 3 is a dash panel 29, referring to FIG. 14. A lower end of the dash panel 29 is connected to a front end of the floor panel 28. A rear end part of the floor panel 28 is upwardly bent, and partitions between the cabin 3 and the deck 4.

Referring to FIG. 13, a drive system of the vehicle 1 includes an engine 32, a transmission 33, a power transfer unit 34, a front wheel propeller shaft 35, a front differential gear unit 36, a rear wheel propeller shaft 37, and a rear differential gear unit 38. In the present embodiment, the vehicle 1 is a four-wheel-drive vehicle (4WD vehicle) in which front wheels 6 and rear wheels 7 are driven. However, the vehicle 1 may be a two-wheel-drive vehicle (2WD vehicle) in which only the rear wheels 7 are driven. In the case of the 2WD vehicle, the power transfer unit 34 the front wheel propeller shaft 35, and the front differential gear unit 36 are not provided.

Figure 15:
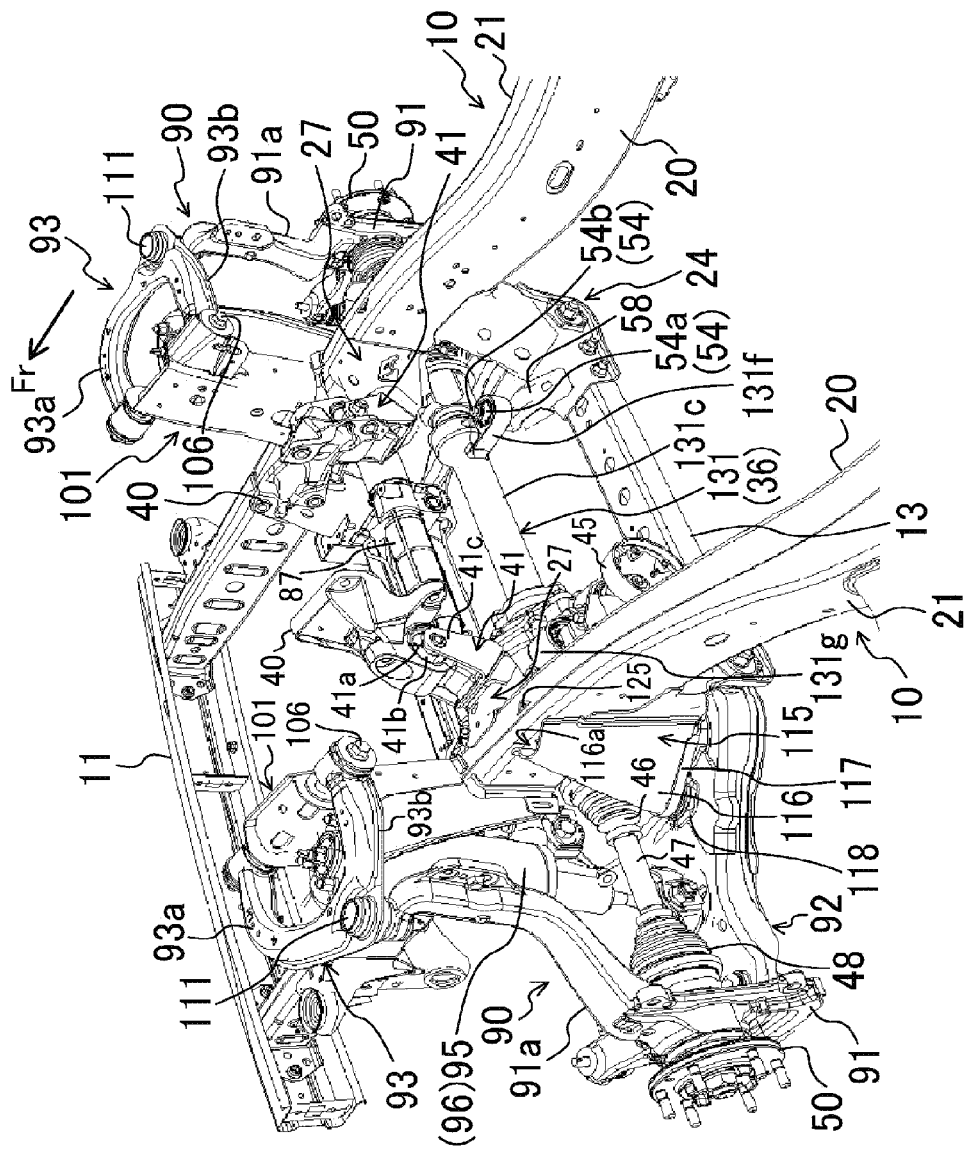
FIG. 15 is a perspective view of the front part of the component-mounted chassis frame diagonally from the upper left rear side of the vehicle.

The engine 32 is a longitudinal engine including a plurality of cylinders (in the present embodiment, five cylinders) arranged in rows in the vehicle length direction, and the transmission 33 is connected to a rear side of the engine 32. Referring to FIG. 15, a bracket 40 protruding toward the left is attached to a left side surface of the engine 32, and a bracket 40 protruding toward the right is attached to a right side surface of the engine 32. In a tip end part of the bracket 40, an engine mount 41 including a cylindrical rubber bush 41*a* is held such that a central axis of the rubber bush 41*a* extends in the vehicle length direction. The engine mount 41 further includes a central shaft 41*b* penetrating a center part of the rubber bush 41*a* in the vehicle length direction, and a support member 41*c* configured to support the central shaft 41*b* at both ends thereof. An engine mount bracket 27 is attached to the narrow part 10*a* of the main frame 10 so as to be positioned below the support member 41*c* The support member 41*c* is attached onto the engine mount bracket 27, and therefore the engine 32 is elastically supported on the engine mount brackets 27 through the brackets 40 and the engine mounts 41.

Referring to FIGS. 7-9 and 21, each of the engine mount brackets 27 includes an upper member 27*a* and a lower member 27*b* which are welded to an inner surface of the main frame 10 in the vehicle width direction (surface of the inner panel 20 of the main frame 10) and protrude from the inner surface toward the inner side in the vehicle width direction. The upper member 27*a* is formed in a substantially inverted U-shape as viewed in a cross section along the vehicle length direction, and the lower member 27*b* is formed in a substantially U-shape as viewed in the cross section along the vehicle length direction. Side end parts of the upper member 27*a* in the vehicle length direction and side end parts of the lower member 27*b* in the vehicle length direction are joined together. That is, the side end part of the upper member 27*a* on the front and the side end part of the lower member 27*b* on the front are joined together, and the side end part of the upper member 27*a* on the rear and the side end part of the lower member 27*b* on the rear are joined together. A space is formed between the members 27*a*, 27*b*, and opens on the inner side in the vehicle width direction. The support member 41*c* of the engine mount 41 is attached to an upper surface of the upper member 27*a* through a reinforcing member 27*c*. On the other hand, a notch 27*d* opening on the inner side in the vehicle width direction and formed in a substantially U-shape as viewed in the plane is formed in a bottom part (horizontally-extending part) of the lower member 27*b* (see FIGS. 9 and 21). The notch 27*d* is formed so that the engine mount bracket 27 can be compressed and deformed in the vehicle length direction as much as possible upon a frontal collision of the vehicle 1. At the inner surface of the main frame 10 in the vehicle width direction (surface of the inner panel 20 of the main frame 10), an elongated hole 128 extending in the vehicle length direction is formed so as to overlap with the engine mount bracket 27 in the vehicle length direction (formed at a position corresponding the space between the members 27*a*, 27*b*) (see FIG. 9). The elongated hole 128 allows the engine mount bracket 27 and an attachment part of the main frame 10 and the engine mount bracket 27 to be compressed and deformed in the vehicle length direction as much as possible.

The power transfer unit 34 is connected to a rear side of the transmission 33, and distributes output of the transmission 33 to the front wheels 6 and the rear wheels 7. A mount attachment part 14*a* provided in a center part of an upper surface of the fourth cross-member 14 in the vehicle width direction supports the power transfer unit 34 through a rubber mount.

In the case of the 2WD vehicle, the power transfer unit 34 is not provided. Thus, the rear wheel propeller shaft 37 is extended toward the front by the size of the power transfer unit 34, and is connected to a rear end of the transmission 33. An extension extending toward the rear so as to reach the mount attachment part 14*a* provided on the upper surface of the fourth cross-member 14 is formed in a lower part of the transmission 33 (part of the transmission 33 below a connection part of the transmission 33 and the rear wheel propeller shaft 37), and the transmission 33 is, at the extension, supported by the mount attachment part 14*a* through the rubber mount.

A rear end of the front wheel propeller shaft 35 extending along a left side of the transmission 33 in the vehicle length direction is connected to a left side part (part protruding toward the left) of the power transfer unit 34, and a front end of the rear wheel propeller shaft 37 extending in the vehicle length direction is connected to a rear end of the power transfer unit 34.

The rear end of the front wheel propeller shaft 35 is connected to the power transfer unit 34 through a constant velocity joint 44, and a front end of the front wheel propeller shaft 35 is connected to the front differential gear unit 36 (specifically connected to an input shaft which will be described later) through a constant velocity joint 45.

Referring to FIGS. 15-20, the front differential gear unit 36 includes a case 131 accommodating a differential gear etc. The case 131 includes a gear accommodation part 131*a* accommodating the differential gear, a left output shaft accommodation part 131*b* accommodating a left output shaft extending in the vehicle width direction, a right output shaft accommodation part 131*c* accommodating a right output shaft extending in the vehicle width direction, and an input shaft accommodation part 131*d* connected to the front wheel propeller shaft 35 and accommodating the input shaft extending in the vehicle length direction. The left output shaft accommodation part 131*b* is in a cylindrical shape covering the left output shaft, and the right output shaft accommodation part 131*c* is in a cylindrical shape covering the right output shaft. The left output shaft accommodation part 131*b* extends toward one side of the gear accommodation part 131*a* in the vehicle width direction, and the right output shaft accommodation part 131*c* extends toward the other side of the gear accommodation part 131*a* in the vehicle width direction. The input shaft accommodation part 131*d* extends from the gear accommodation part 131a toward the rear, and a rear end part of the input shaft (i.e., the constant velocity joint 45) protrudes from a rear end of the input shaft accommodation part 131d.

Since the front wheel propeller shaft 35 is positioned on the left of the transmission 33, the gear accommodation part 131a is positioned on the left of the engine 32. Thus, the length of the right output shaft accommodation part 131c in the vehicle width direction is longer than that of the left output shaft accommodation part 131b, and the right output shaft accommodation part 131c passes below the engine 32 and extends to the vicinity of the right main frame 10.

Figure 16:
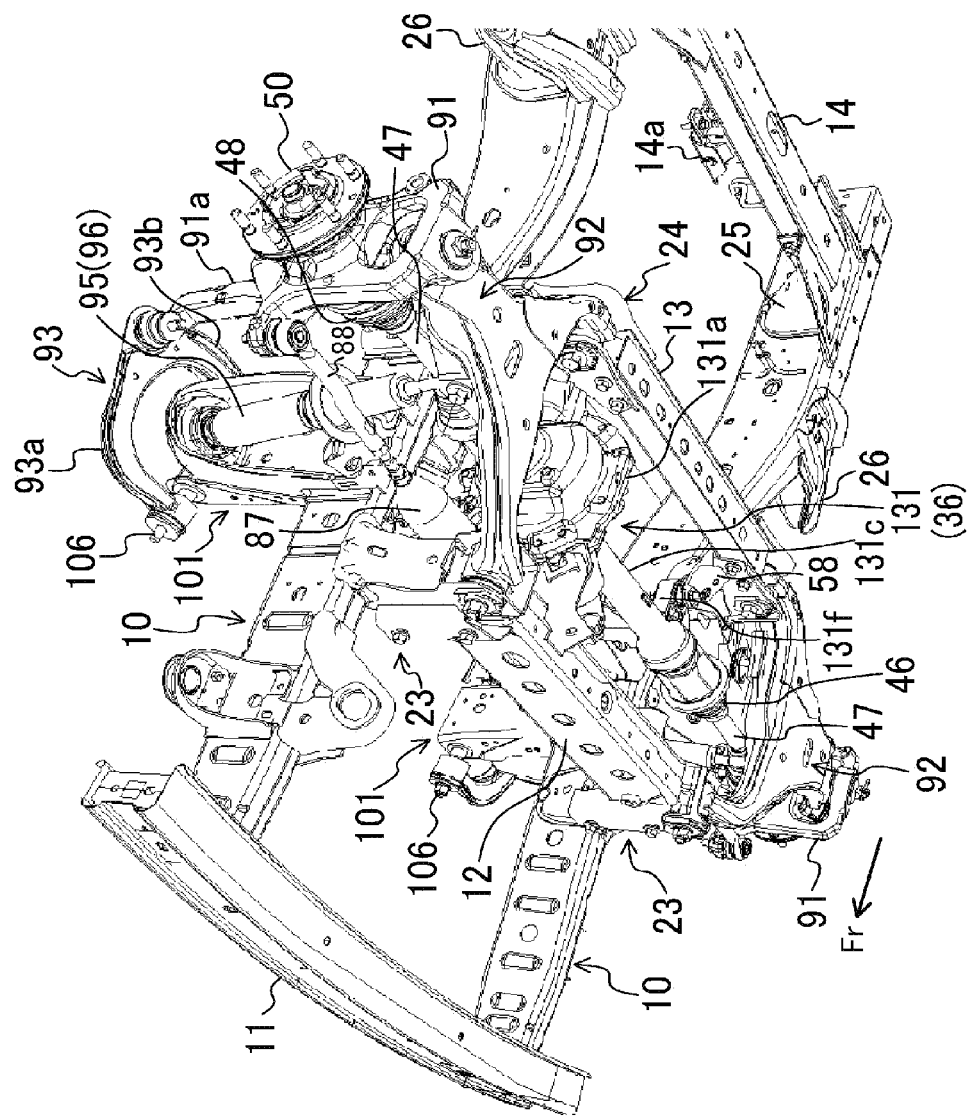
FIG. 16 is a perspective view of the front part of the component-mounted chassis frame diagonally from a lower left front side of the vehicle.
Figure 17:
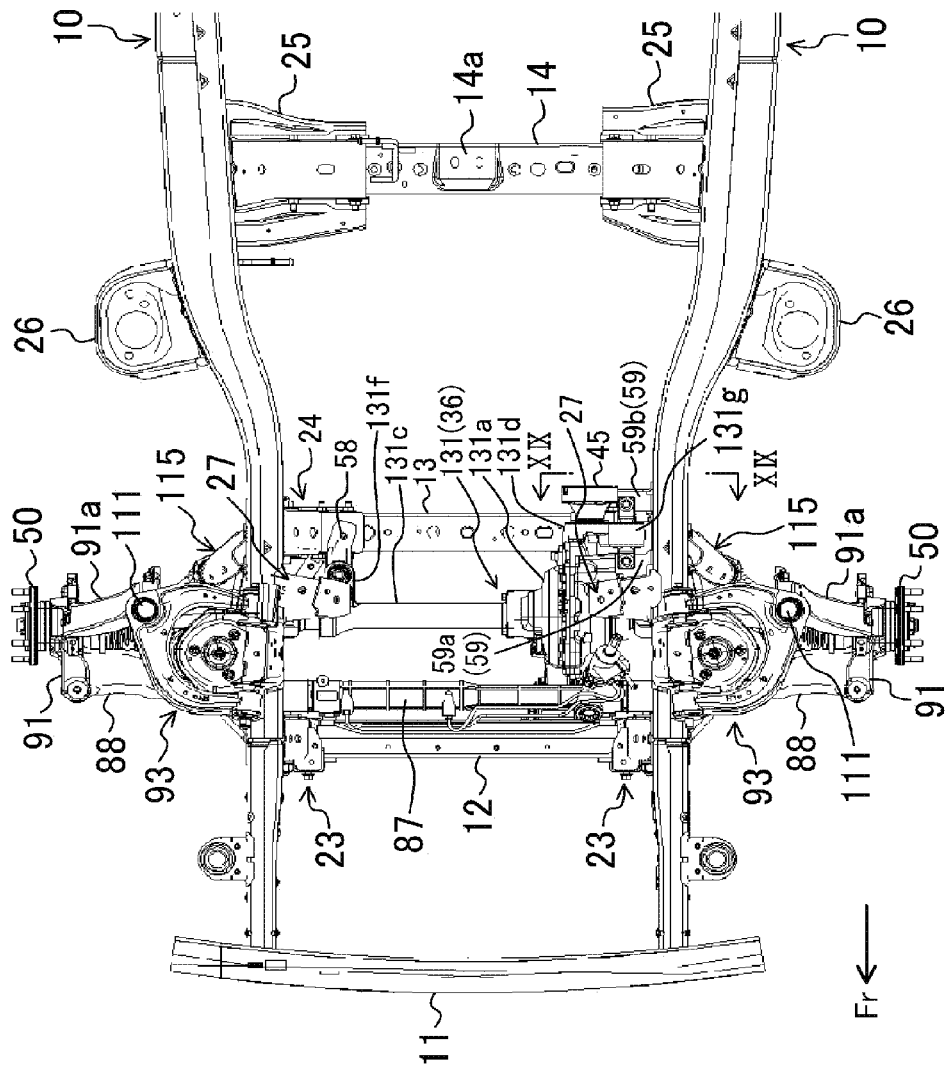
FIG. 17 is a plan view illustrating the front part of the component-mounted chassis frame.
Figure 18:
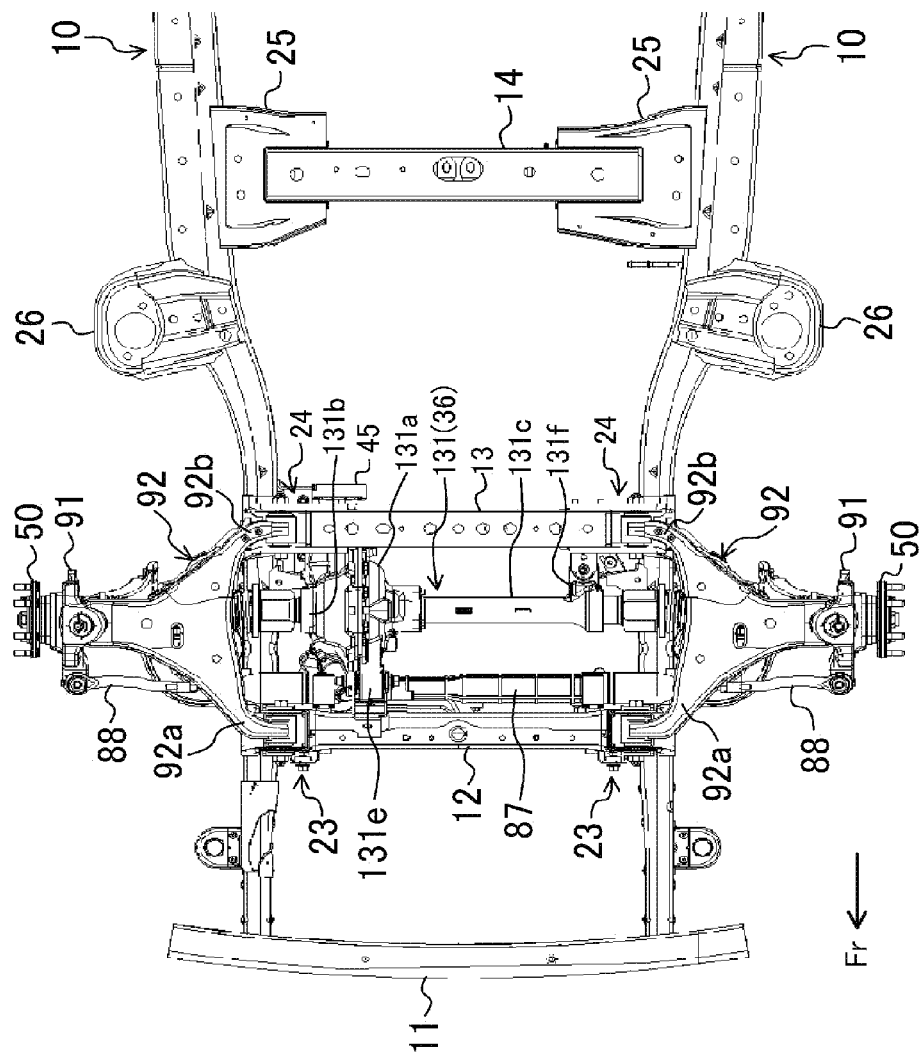
FIG. 18 is a bottom view illustrating the front part of the component-mounted chassis frame.
Figure 19:
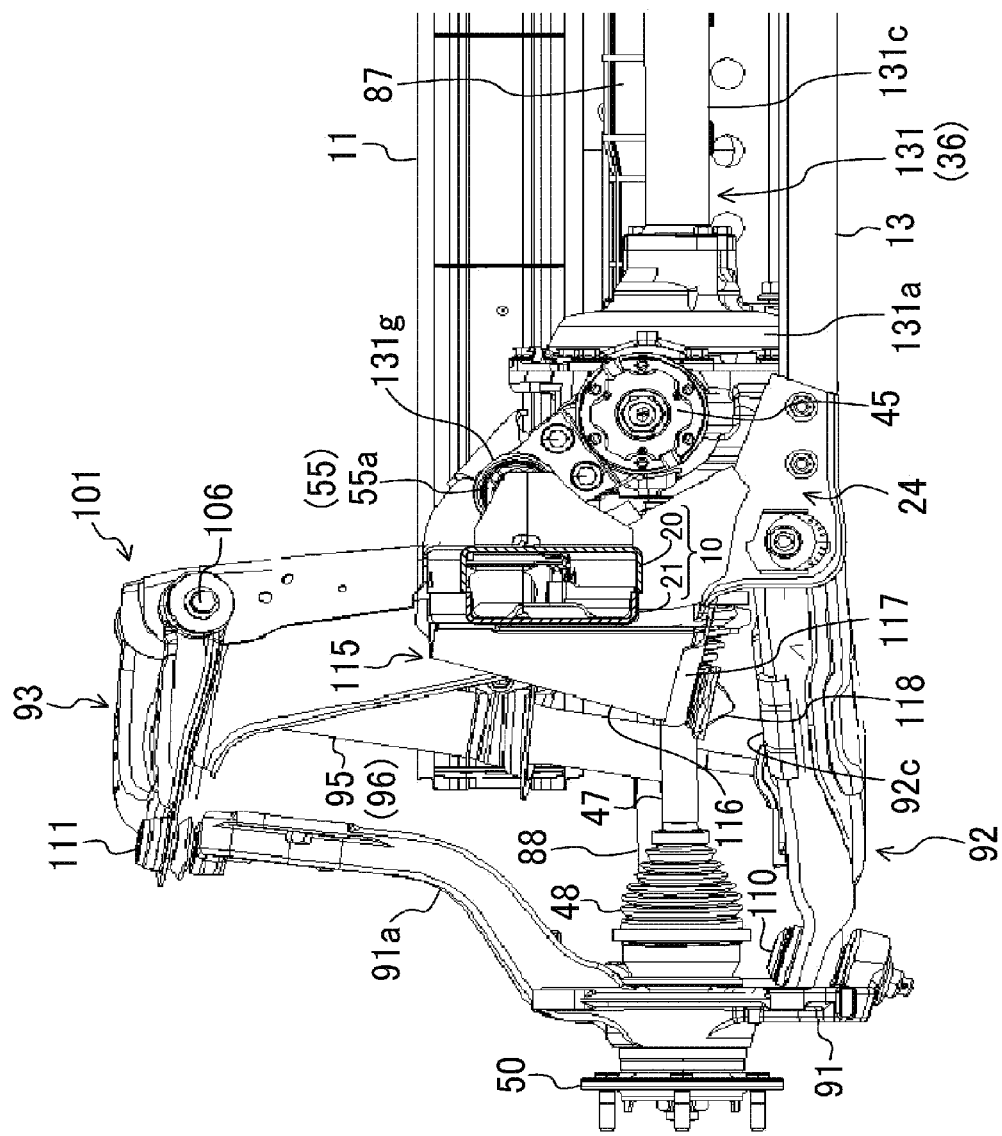
FIG. 19 is a cross-sectional view along an XIX-XIX line illustrated in FIG. 17.

Referring to FIGS. 15 and 16, one of the output shafts is connected to a right front wheel drive shaft 47 extending in the vehicle width direction through a constant velocity joint accommodated in a boot 46, and the other output shaft is connected to a left front wheel drive shaft 47 extending in the vehicle width direction through a constant velocity joint accommodated in a boot 46. The right front wheel drive shaft 47 is connected to a hub 50 holding the right front wheel 6 through a constant velocity joint accommodated in a boot 48, and the left front wheel drive shaft 47 is connected to a hub 50 holding the left front wheel 6 through a constant velocity joint accommodated in a boot 48. Such constant velocity joints are adaptable to vertical movement of the front wheel 6 relative to the output shaft and movement of the front wheel 6 by steering which will be described later.

According to the foregoing configuration, power of the engine 32 is transmitted to the right and left front wheels 6 through the transmission 33, the power transfer unit 34, the front wheel propeller shaft 35, the front differential gear unit 36, and the right and left front wheel drive shafts 47.

The front differential gear unit 36 is elastically supported by the chassis frame 9 at three points. Specifically, a first mount bracket 57 configured to support a first mount 53 including a cylindrical rubber bush 53a is provided at a position closer to the left on a rear surface of the second cross-member 12 (see FIGS. 3, 5, 6, 20, and 21). In addition, a second mount bracket 58 configured to support a second mount 54 including a cylindrical rubber bush 54a is provided in a right end part of an upper surface of the third cross-member 13 (specifically on an upper surface of the cross-member bracket 24) (see FIGS. 3, 4, and 15-17). Further, a third mount bracket 59 configured to support a third mount 55 including a cylindrical rubber bush 55a is provided at a position above the third cross-member 13 on the inner surface of the left main frame 10 in the vehicle width direction (see FIGS. 3, 4, 7-9, 17, and 20). The third mount bracket 59 is divided into a front divided part 59a and a rear divided part 59b.

The first mount 53 further includes a central shaft 53b penetrating a center part of the rubber bush 53a. The central shaft 53b is at both end parts thereof, supported by the first mount bracket 57.

The second mount 54 further includes a central shaft 54b penetrating a center part of the rubber bush 54a. One end part (lower end part) of the central shaft 54b is an external thread part to be engaged with an internal thread part of a weld nut provided on a lower surface of the second mount bracket 58, and the other end part (upper end part) of the central shaft 54b is in a hexagonal shape so as to be engaged with a tool for fastening the external thread part into the internal thread part. The second mount 54 is supported on the second mount bracket 58 in the foregoing fastening state.

The third mount 55 further includes a central shaft 55b penetrating a center part of the rubber bush 55a. Both of end parts of the central shaft 55b are in a plate shape extending in the horizontal direction, and are, from above, fastened respectively to the front divided part 59a and the rear divided part 59b with bolts 60 (see FIGS. 9 and 20).

Figure 20:
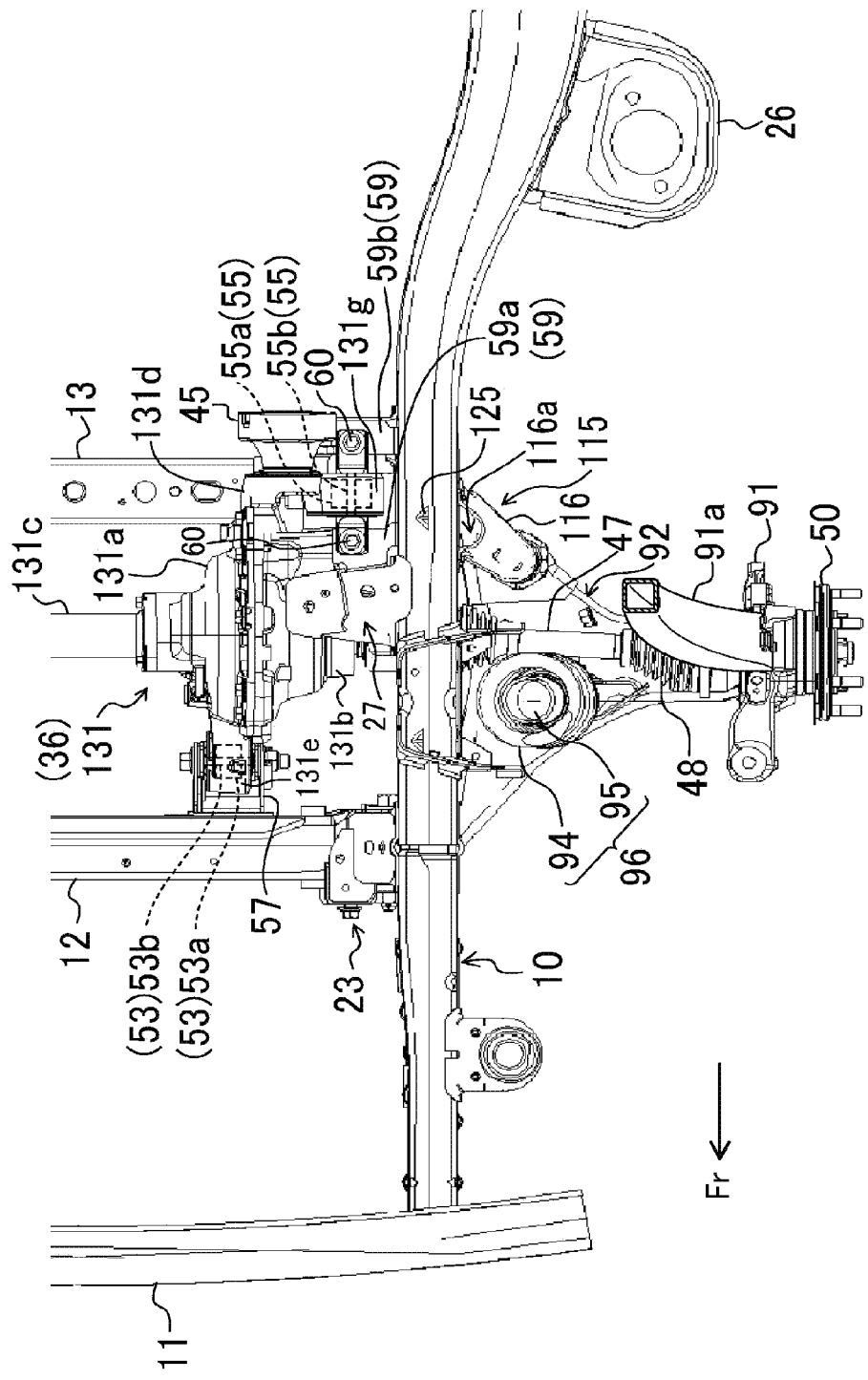
FIG. 20 is a cross-sectional view along an XX-XX line illustrated in FIG. 14.
Figure 21:
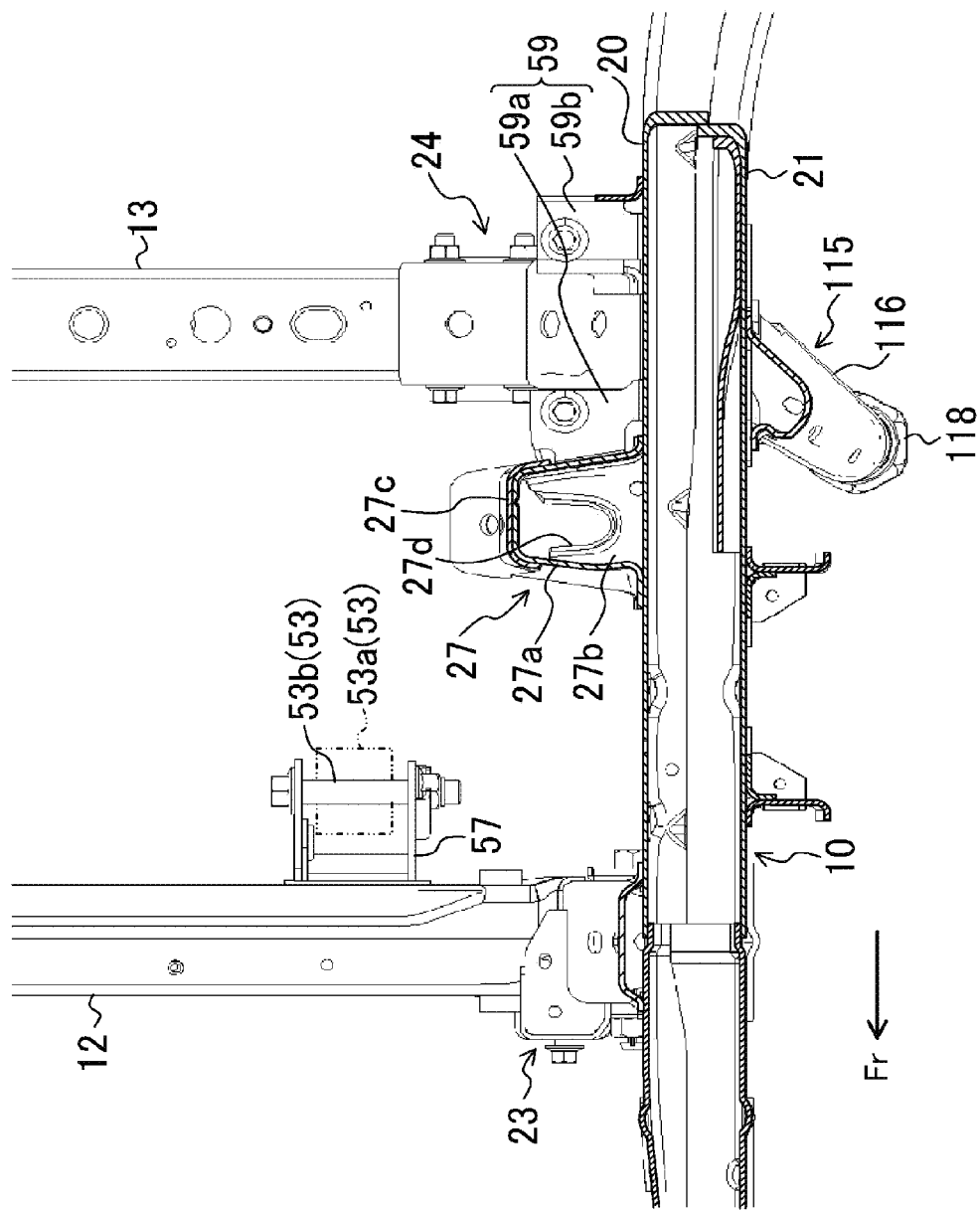
FIG. 21 is a cross-sectional view along an XXI-XXI line illustrated in FIG. 14 (note that most of the mounted components illustrated in FIG. 20 are not shown).
Figure 22:
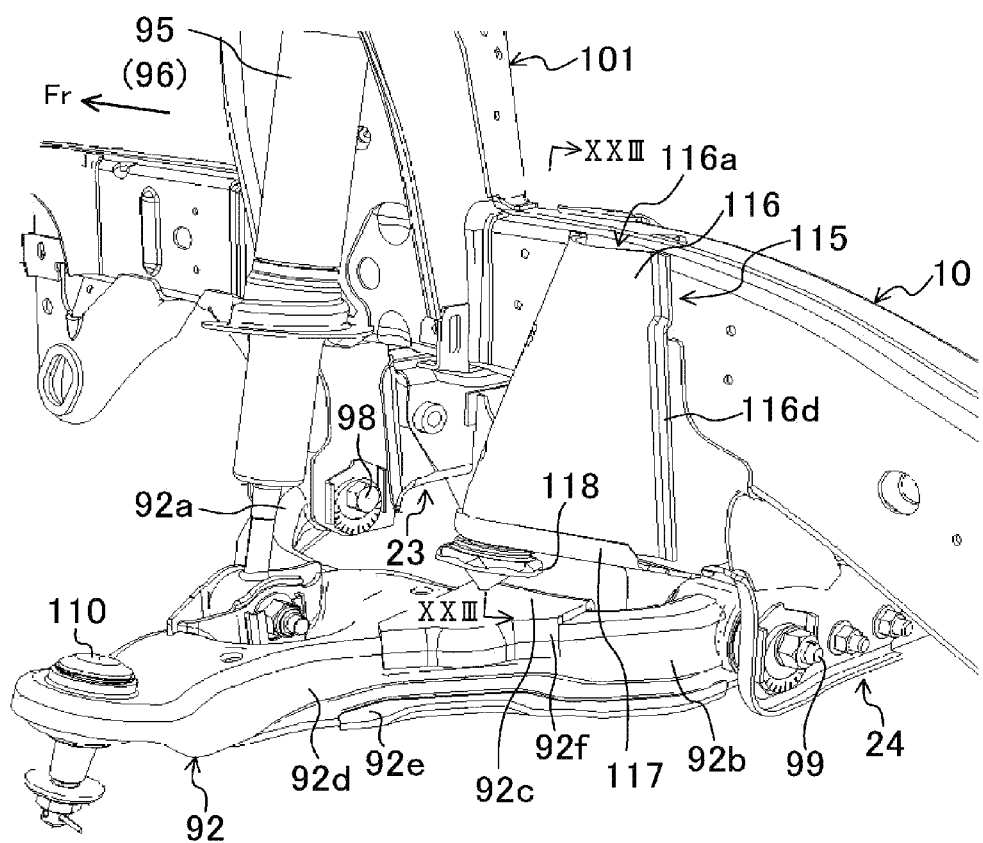
FIG. 22 is a perspective view illustrating the vicinity of a bump stopper in the outer part of the left main frame of the component-mounted chassis frame in the vehicle width direction.

A first mount holding part 131e protruding toward the front and configured to hold, at a tip end thereof, the periphery of the rubber bush 53a of the first mount 53 is formed in a front part of the gear accommodation part 131a of the front differential gear unit 36 (see FIG. 20). In addition, a second mount holding part 131f protruding toward the rear and configured to hold, at a tip end thereof, the periphery of the rubber bush 54a of the second mount 54 is formed in a tip end part (right end part) of the right output shaft accommodation part 131c (see FIGS. 15 and 17). Further, a third mount holding part 131g protruding toward the upper left and configured to hold, at a tip end thereof, the periphery of the rubber bush 55a of the third mount 55 is formed in a rear part of the input shaft accommodation part 131d (see FIGS. 17 and 20).

Thus, the front differential gear unit 36 is attached to the chassis frame 9 through the first to third mounts 53-55 and the first to third mount brackets 57-59.

In the case of the 2WD vehicle, the front differential gear unit 36 is not provided. Thus, the first to third mount brackets 57-59 are not provided.

Figure 24:
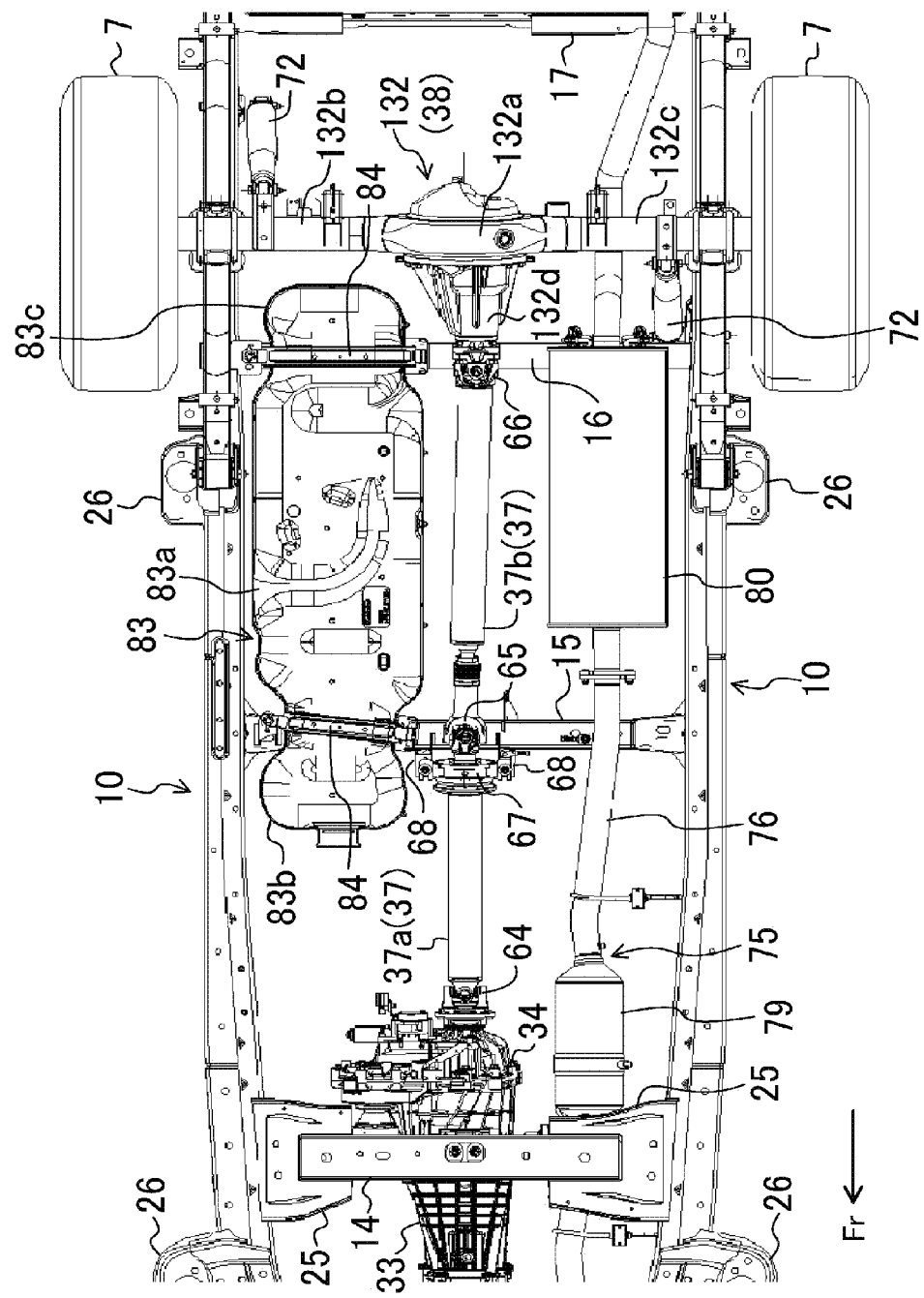
FIG. 24 is a bottom view illustrating a rear part of the component-mounted chassis frame.

Referring to FIGS. 13 and 24, the rear wheel propeller shaft 37 includes a front shaft 37a and a rear shaft 37b connected together through a joint (in the present embodiment, a universal joint 65). A front end of the front shaft 37a is connected to the rear end of the power transfer unit 34 through a universal joint 64, and a rear end of the front shaft 37a is connected to a front end of the rear shaft 37b through the universal joint 65 (see FIG. 24) positioned below the fifth cross-member 15. The front shaft 37a extends, as viewed in the plane, straight from the universal joint 64 toward the rear in the middle between the main frames 10 in the vehicle width direction. The front shaft 37a is downwardly inclined toward the rear.

Referring to FIG. 24 (since FIG. 24 is a bottom view, the right and left are opposite as those shown in FIG. 13), the rear shaft 37b extends from the universal joint 65 toward the rear, and is connected to the rear differential gear unit 38 (specifically connected to an input shaft which will be described later) through a universal joint 66. The rear shaft 37b is downwardly inclined toward the rear, and is slightly inclined toward a rear right side (a side opposite to a fuel tank 83 which will be described later) as viewed in the plane. Thus, as viewed in the plane, the rear wheel propeller shaft 37 is bent at the universal joint 65 such that the universal joint 65 is positioned on the left relative to a straight line connecting both ends of the rear wheel propeller shaft 37 the front end of the front shaft 37a and a rear end of the rear shaft 37b).

The rear wheel propeller shaft 37 is, at a middle part in a length direction thereof, supported by a propeller shaft center bearing 67 (hereinafter simply referred to as a "center bearing 67"). Specifically, the rear wheel propeller shaft 37 is, at the vicinity of the rear end of the front shaft 37a (part of the front shaft 37a near the universal joint 65), supported by the center bearing 67. The center bearing 67 is supported by bearing brackets 68 attached to the fifth cross-member 15, and is positioned near the front side of the fifth cross-member 15. Upon the frontal collision of the vehicle 1, impact force from the front to the rear acts on the rear wheel propeller shaft 37 (front shaft 37a) due to, e.g., backward movement of the engine 32. In such a state, the front shaft 37a pushes the center bearing 67 toward the rear, and therefore the impact force from the front to the rear acts on the center bearing 67. If the impact force is too large, the center bearing 67 receiving the impact force is detached from the bearing bracket 68. Thus, the rear wheel propeller shaft 37 and the center bearing 67 are detached from the fifth cross-member 15.

Referring to FIG. 24, the rear differential gear unit 38 includes an axle housing 132 accommodating a differential gear etc. The axle housing 132 includes a gear accommodation part 132a accommodating the differential gear, a left drive shaft accommodation part 132b extending in the vehicle width direction and accommodating a left rear wheel drive shaft configured to drive the left rear wheel 7, a right drive shaft accommodation part 132c extending in the vehicle width direction and accommodating a right rear wheel drive shaft configured to drive the right rear wheel 7, and an input shaft accommodation part 132d connected to the rear shaft 37b and accommodating the input shaft extending in the vehicle length direction. Each of the drive shaft accommodation parts 132b, 132c is in a cylindrical shape so as to cover the periphery of the rear wheel drive shaft. One of the drive shaft accommodation parts 132b, 132e extends toward one side of the gear accommodation part 132a in the vehicle width direction, and the other one of the drive shaft accommodation parts 132b, 132c extends toward the other side of the gear accommodation part 132a in the vehicle width direction.

Each of the drive shaft accommodation parts 132b, 132c is supported by a leaf spring 71 attached to a rear part of the wide part 10b of the main frame 10 (see FIG. 14). A shock absorber 72 is arranged between the left drive shaft accommodation part 132b and part of the left main frame 10 on the rear relative to the left drive shaft accommodation part 132b, and another shock absorber 72 is arranged between the right drive shaft accommodation part 132c and part of the right main frame 10 on the front relative to the right drive shaft accommodation part 132c (see FIGS. 13, 14, and 24).

An exhaust device 75 of the engine 32 is arranged at the right of the engine 32 (see FIGS. 13 and 24). The exhaust device 75 includes an exhaust pipe 76 extending to the vicinity of a rear end of the vehicle 1. An upstream exhaust purification device 77, a flexible joint 78, a downstream exhaust purification device 79, and a muffler 80 are, in this order from an upstream side, attached to the exhaust pipe 76. Each of the upstream and downstream exhaust purification devices 77, 79 has a three-way catalyst, and purifies exhaust from the engine 32. Particularly in order to purify HC and CO from the engine 32 which is in a cold state, the upstream exhaust purification device 77 is arranged near the engine 32. The flexible joint 78 is configured to reduce transmission of vibration of the engine 32 to part of the exhaust pipe 76 downstream of the flexible joint 78. The muffler 80 is arranged at the right of the rear shaft 37b of the rear wheel propeller shaft 37 between the fifth and sixth cross-members 15, 16.

The fuel tank 83 made of resin and storing fuel to be supplied to the engine 32 is arranged at the left of the rear shaft 37b (see FIGS. 13, 14, and 24). The fuel tank 83 is basically positioned between the fifth and sixth cross-members 15, 16. Part of the fuel tank 83 positioned between the fifth and sixth cross-members 15, 16 is hereinafter referred to as a "tank body 83a." A front extension 83b extending toward the front beyond the fifth cross-member 15 and arranged next to the center bearing 67 in the vehicle width direction is provided in the front of the tank body 83a. A rear extension 83c extending toward the rear beyond the sixth cross-member 16 is provided in the rear of the tank body 83a. The fuel tank 83 is narrowed in the vehicle width direction at a boundary between the tank body 83a and the front extension 83b and a boundary between the tank body 83a and the rear extension 83c. The fuel tank 83 is, at the foregoing two narrow parts, attached and fixed to lower surfaces of the fifth and sixth cross-members 15, 16 through band-shaped tank attachment members 84 (see FIG. 24). Although not shown in the figure, an insulator which is a thin steel plate for blocking heat from the exhaust pipe 76 and the muffler 80 is provided on a right side surface of the fuel tank 83. In addition, an under guard which is a thin steel plate is provided on a lower surface of the fuel tank 83. Such an under guard is also provided at the following positions: a position below the engine 32; a position between the first and second cross-members; and a position below the power transfer unit 34.

The right and left front wheels 6 are steered by a steering mechanism operated in synchronization with a steering wheel operated by a passenger. In the steering mechanism, a pinion is rotated by operating the steering wheel, and a rack engaged with the pinion is accommodated in a steering gear box 87 (see FIGS. 13 and 15-18). The rack extends in the vehicle width direction, and is, at both ends thereof, attached to right and left steering rods 88 (see FIGS. 16 and 18). Each of the steering rods 88 is connected to a knuckle 91 provided in an inner part of the hub 50 in the vehicle width direction.

Referring to FIGS. 15-20, the right and left front wheels 6 are supported respectively by right and left front wheel suspension devices 90 (indicated by a reference number "90" only in FIG. 15). Each of the front wheel suspension devices 90 is a high mount type double wishbone suspension. Each of the front wheel suspension devices 90 includes the knuckle 91, a lower arm 92, an upper arm 93, a coil spring 94 (illustrated only in FIG. 20), and a shock absorber 95. Note that a stabilizer provided in the front wheel suspension device 90 is not shown in the figure.

The lower arm 92 is in such a shape that the lower arm 92 is branched into two front and rear parts in a base end part thereof (inner part thereof in the vehicle width direction). A front base end part 92a of the lower arm 92 is attached to the second cross-member 12 through the cross-member bracket 23, and a rear base end part 92b of the lower arm 92 is attached to the third cross-member 13 through the cross-member bracket 24. Specifically, the front base end part 92a is rotatably attached to a lower arm pivot 98 (see FIGS. 6 and 22) which is provided so as to extend in the vehicle length direction in the cross-member bracket 23, and the rear base end part 92b is rotatably attached to a lower arm pivot 99 (see FIGS. 6 and 22) which is provided so as to extend in the vehicle length direction in the cross-member bracket 24. This allows the lower arm 92 to vertically swing about the lower arm pivots 98, 99.

The upper arm 93 is in such a shape that the upper arm 93 is branched into two front and rear parts in a base end part thereof. A front base end part 93a of the upper arm 93 is rotatably attached to one end part of an upper arm pivot 106 (see FIGS. 15-17 and 19) which is provided so as to extend in the vehicle length direction in an inner panel 102 of a suspension tower 101 which will be described later, and a rear base end part 93b of the upper arm 93 is rotatably attached to the other end part of the upper arm pivot 106. This allows the upper arm 93 to vertically swing about the upper arm pivot 106.

The lower arm 92 outwardly extends from the front and rear base end parts 92a, 92b in the vehicle width direction relative to the main frame 10. The lower arm 92 is, in a tip end part thereof (outer end part thereof in the vehicle width direction), connected to a lower end part of the knuckle 91 through a ball joint 110 (see FIGS. 19 and 22). The upper arm 93 outwardly extends from the front and rear base end parts 93a, 93b in the vehicle width direction relative to the main frame 10. The upper arm 93 is, in a tip end part thereof (outer end part thereof in the vehicle width direction), connected to an upper end part of an arm part 91a upwardly extending toward an upper part of the knuckle 91 through a ball joint 111 (see FIGS. 15, 17, and 19). Thus, the knuckle 91, the lower arm 92, and the upper arm 93 vertically swing in synchronization with the vertical movement of the front wheel 6.

A bump stopper 115 (see FIGS. 2-6, 15, 17, and 19-23) is welded to an outer surface of the main frame 10 in the vehicle width direction. The bump stopper 115 is configured to contact a contact part 92c provided near the rear base end part 92b on an upper surface of the lower arm 92 and restrict upward movement of the lower arm 92 beyond a position where the bump stopper 115 and the contact part 92c contact each other. The lower arm 92 is formed by two upper and lower plate members 92d, 92e (a space is formed between the plate members 92d, 92e), and another plate member 92f is welded to the contact part 92c in order to increase the strength of the contact part 92c (see FIG. 22).

Each of the bump stoppers 115 includes a stopper body 116 attached to the outer surface of the main frame 10 in the vehicle width direction so as to outwardly protrude in the vehicle width direction. The stopper body 116 is a panel which is formed in a bag shape (in the present embodiment, a substantially U-shape) opening on the inner side in the vehicle width direction as viewed in a cross section along the horizontal direction and which opens at both of upper and lower ends. End parts of the panel at sides of the opening on the inner side in the vehicle width direction (end parts of the U-shape as viewed in the cross section), i.e., a front attachment part 116c and a rear attachment part 116d (see FIGS. 6, 22, and 23) of the stopper body 116, are attached to the outer surface of the main frame 10 in the vehicle width direction with the end parts of the panel being apart from each other in the vehicle length direction. That is, the stopper body 116 is attached to the main frame 10 at the end parts of the U-shape as viewed in the cross section (at the front and rear attachment parts 116c, 116d).

The opening of the stopper body 116 at the upper end of the panel is hereinafter referred to as an "upper opening 116a," and the opening of the stopper body 116 at the lower end of the panel is hereinafter referred to as a "lower opening 116b." Since the stopper body 116 is attached to the main frame 10 at the front and rear attachment parts 116c, 116d, the opening of the panel on the inner side in the vehicle width direction is closed, and the stopper body 116 and part of the main frame 10 together form a vertically-extending cylindrical shape which opens at both of upper and lower ends in the vertical direction. The openings at the upper and lower ends in the vertical direction are the upper opening 116a and the lower opening 116b, respectively. Thus, it can be said that the upper opening 116a is formed between an upper end part of the stopper body 116 and the outer surface of the main frame 10 in the vehicle width direction. In addition, it can be said that the lower opening 116b is formed between a lower end part of the stopper body 116 and the outer surface of the main frame 10 (specifically the cross-member bracket 24) in the vehicle width direction.

In the present embodiment, the amount of outward protrusion of the stopper body 116 from the main frame 10 in the vehicle width direction is gradually increased toward the bottom of the stopper body 116. Thus, as viewed in the vehicle length direction, a tip end of the stopper body 116 is downwardly inclined toward the outer side in the vehicle width direction. An opening area of the lower opening 116b is larger than that of the upper opening 116a.

Of the upper opening 116a and the lower opening 116b, only the lower opening 116b is covered by a closing member 117 (see FIGS. 4, 6, 22, and 23). A contact member 118 contacting the lower arm 92 is attached to an outer part of a lower surface of the closing member 117 in the vehicle width direction. That is, the contact member 118 is attached to the stopper body 116 so as to be positioned in the vicinity of the lower opening 116b of the stopper body 116, and is attached to the stopper body 116 through the closing member 117 covering the lower opening 116b of the stopper body 116.

Figure 23:
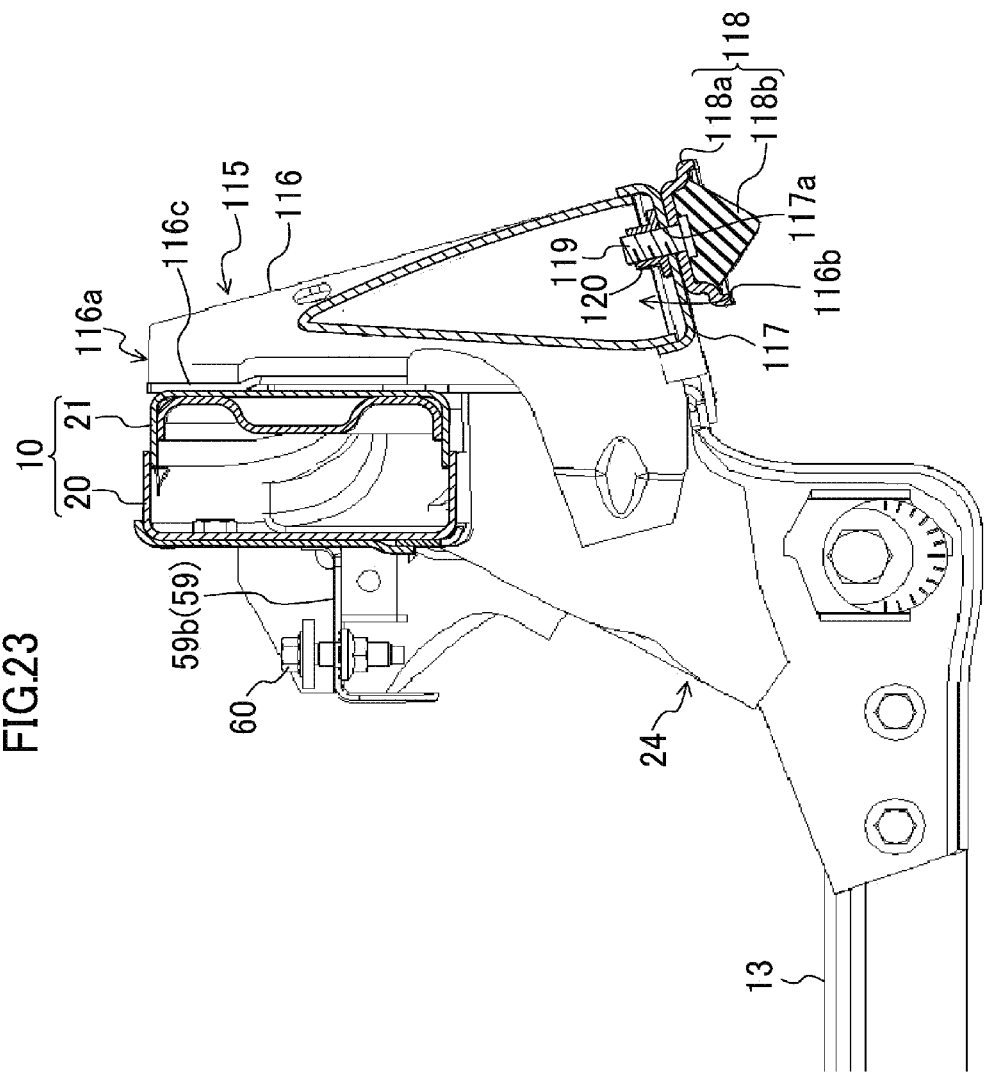
FIG. 23 is a cross-sectional view along an XXIII-XXIII line illustrated in FIG. 22.

Specifically, referring to FIG. 23, the contact member 118 includes an inverted dish-shaped base 118a fixed to the closing member 117, and a rubber contact part 118b vulcanized and bonded to the base 118a and formed in a downwardly-pointing conical shape. The contact part 92c of the lower arm 92 contacts the rubber contact part 118b. A stud bolt 119 is welded to a center part of the base 118a so as to upwardly protrude, and a weld nut 120 into which the stud bolt 119 is screwed is welded to an upper surface of the closing member 117. A through-hole 117a is formed at a position of the closing member 117 corresponding to the weld nut 120 (see FIGS. 6 and 23). When the contact member 118 is attached to the lower surface of the closing member 117, the stud bolt 119 is inserted into the through-hole 117a, and then the base 118a is rotated. In such a manner, the stud bolt 119 is screwed into the weld nut 120.

The rear attachment part 116d of the stopper body 116 is, at a position where the rear attachment part 116d and the third cross-member 13 overlap with each other in the vehicle length direction, attached to a part extending from an upper end to a lower end in the outer surface of the main frame 10 in the vehicle width direction and to the third cross member 13 (specifically the cross-member bracket 24). In addition, the front attachment part 116c of the stopper body 116 is, at a position between the engine mount bracket 27 and the third cross-member 13 in the vehicle length direction, attached to a part extending from the upper end to the lower end in the outer surface of the main frame 10 in the vehicle width direction.

As described above, in the present embodiment, one of the front and rear attachment parts 116c, 116d (i.e., the front attachment part 116c) of the stopper body 116 is attached to the main frame 10 at a position which does not overlap with the third cross-member 13 and the engine mount bracket 27 in the vehicle length direction. The other one of the front and rear attachment parts 116c, 116d (i.e., the rear attachment part 116d) of the stopper body 116 overlaps with the third cross-member 13 in the vehicle length direction, and is attached to the main frame 10 and the third cross-member 13. Note that both of the front and rear attachment parts 116c, 116d may be attached to the main frame 10 at the position which does not overlap with the third cross-member 13 and the engine mount bracket 27 in the vehicle length direction. In such a case, the front and rear attachment parts 116c, 116d are preferably positioned between the third cross-member 13 and the engine mount bracket 27 in the vehicle length direction, considering a positional relationship among the front and rear attachment parts 116c, 116d and the lower arm 92.

The lower arm 92 is, in the vicinity of the rear base end part 92b (part of the lower arm 92 contacting the contact member 118), forwardly inclined toward the outer side in the vehicle width direction. Thus, in accordance with such a shape, the stopper body 116 and the contact member 118 protrude from the outer surface of the main frame 10 in the vehicle width direction toward the outer side in the vehicle width direction in the state in which the stopper body 116 and the contact member 118 are forwardly inclined toward the outer side in the vehicle width direction.

The configuration and arrangement of the bump stopper 115 allows the bump stopper 115 to be easily compressed and deformed in the vehicle length direction upon the frontal collision of the vehicle 1. Thus, the bump stopper 115 does not prevent the compression deformation of the main frame 10 in the vehicle length direction upon the frontal collision of the vehicle. In the present embodiment, at positions (one of the positions is in an upper surface and the other position is in the lower surface) of the main frame 10 overlapping with the upper opening 116a in the vehicle length direction, a plurality of recessed parts 125 (two recessed parts 125) (see FIGS. 4, 7, 8, 15, and 20) are respectively formed as weak parts configured to facilitate the deformation of the main frame 10 in the longitudinal direction upon the frontal collision of the vehicle 1 (the recessed part formed in the lower surface of the main frame 10 is not shown in the figure). The plurality of recessed parts 125 allow the main frame 10 to be more easily compressed and deformed in the vehicle length direction. In addition, since the front attachment part 116c of the stopper body 116 of the bump stopper 115 does not overlap with the engine mount bracket 27 in the vehicle length direction, advantages similar to those in an later-described arrangement in which a plurality of deformation preventing members are dispersively arranged can be realized. The recessed parts 125 may be formed at any positions of the main frame 10 as long as such positions overlap with the upper opening 116a in the vehicle length direction. The recessed parts 125 are not necessarily formed respectively at multiple positions, and the recessed part 125 may be formed only at a single position. Even if a small hole penetrating the inner panel 20 or the outer panel 21 is formed as the weak part instead of forming the recessed part 125, it is expected that the similar advantages can be realized. In such a case, the small hole functions as a hole which is required for taking an electrodeposition solution in and out of the closed space of the main frame 10 at a step of coating the main frame.

The suspension tower 101 configured to support a top part of a vertically-extending strut 96 (i.e., the coil spring 94 and the shock absorber 95) of the front wheel suspension device 90 is attached to part of the narrow part 10a of the main frame 10 between the second and third cross-members 12, 13 (see, e.g., FIGS. 6-8, 10-12, 15-17, and 19). A lower end part of the strut 96 (lower end part of the shock absorber 95) is connected to the lower arm 92 so as to rotate about an axis extending in the vehicle length direction.

Figure 10:
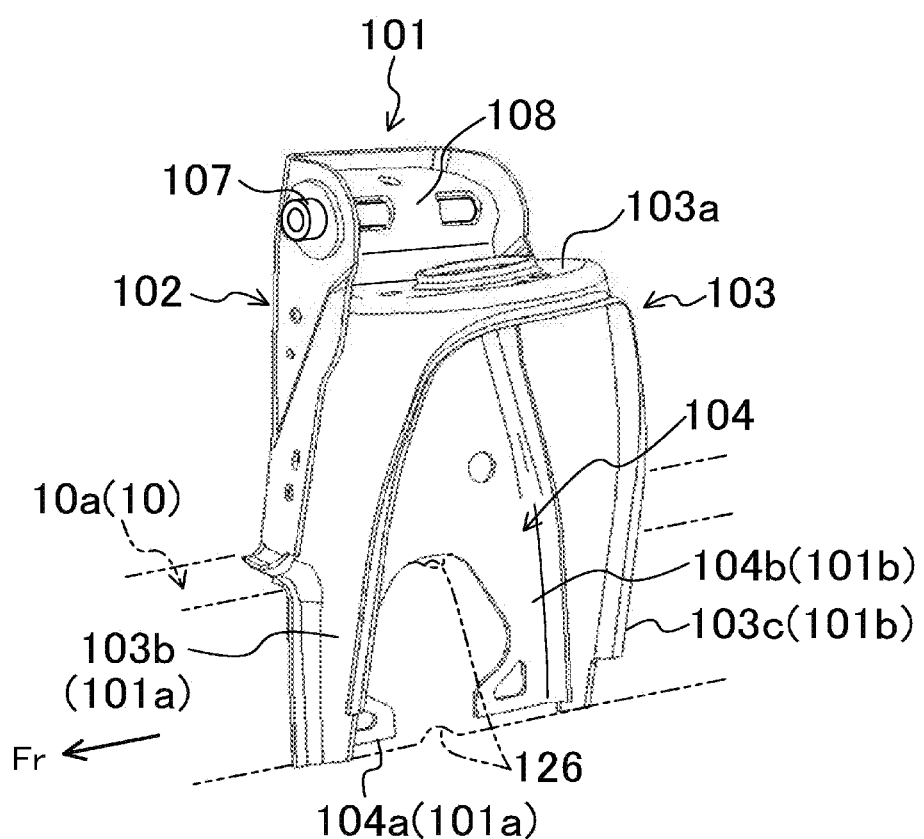
FIG. 10 is a perspective view illustrating the suspension tower of the left main frame.
Figure 11:
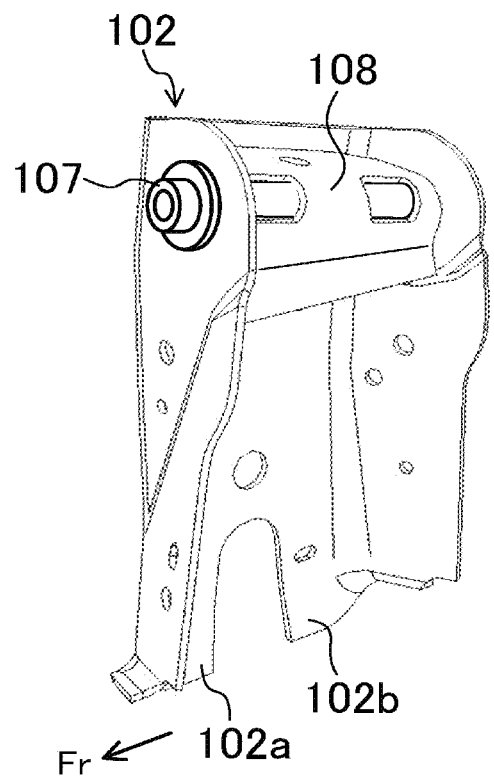
FIG. 11 is a perspective view illustrating inner panel and a stiffener of the suspension tower illustrated in FIG. 10.
Figure 12:
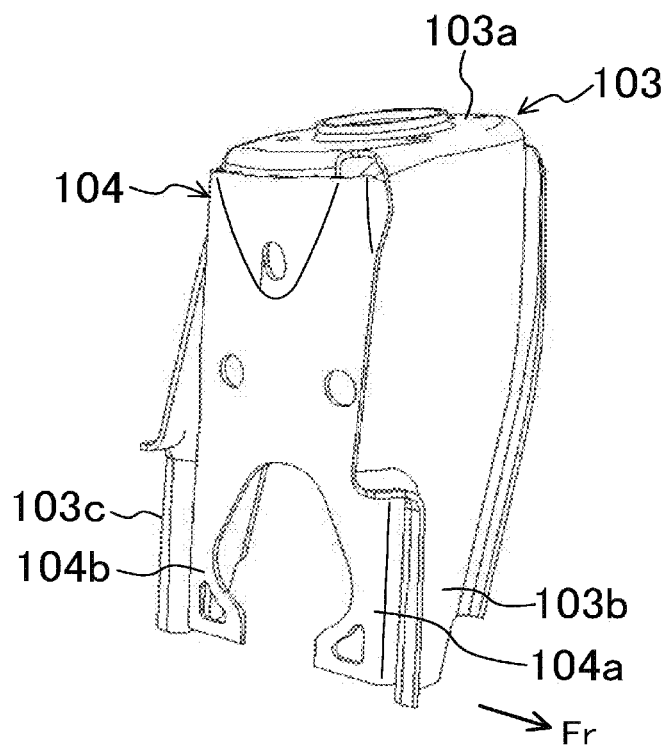
FIG. 12 is a perspective view illustrating an outer panel and a suspension tower reinforcement of the suspension tower illustrated in FIG. 10.

The suspension tower 101 includes the inner panel 102 positioned on the inner side in the vehicle width direction, an outer panel 103 connected to the inner panel 102 and positioned on the outer side in the vehicle width direction, and a suspension tower reinforcement 104 provided between the panels 102, 103 (see, e.g., FIGS. 10-12). In a lower part of the suspension tower 101, a front leg part 101a and a rear leg part 101b are provided so as to be branched and separated from each other in the vehicle length direction.

Specifically, a strut receiving part 103a configured to support the top part of the strut 96 is formed in an upper end part of the outer panel 103. Top parts of the coil spring 94 and the shock absorber 95 are fixed to the strut receiving part 103a and are supported by the strut receiving part 103a. The outer panel 103 includes an outer panel front leg part 103b downwardly extending from an upper front end part of the outer panel 103, and an outer panel rear leg part 103c downwardly extending from an upper rear end part of the outer panel 103.

The suspension tower reinforcement 104 is welded to the outer panel 103 so as to cover an opening of the outer panel 103 between the outer panel front leg part 103b and the outer panel rear leg part 103c on the inner side in the vehicle width direction. A space surrounded by the outer panel front leg part 103b, the outer panel rear leg part 103c, and the suspension tower reinforcement 104 and opening on the outer side in the vehicle width direction is a space accommodating the strut 96. Note that, instead of providing the suspension tower reinforcement 104, the outer panel 103 may be integrally formed to fill a part corresponding to the suspension tower reinforcement 104.

The outer panel 103 to which the suspension tower reinforcement 104 is welded is welded to the inner panel 102. In such a welded state, a closed space is, as viewed in the cross section, fowled between the inner panel 102 and the suspension tower reinforcement 104. If the outer panel 103 is integrally formed to fill the part corresponding to the suspension tower reinforcement 104, a closed space is, as viewed in the cross section, formed between the inner panel 102 and the outer panel 103.

In the foregoing welded state, the inner panel 102 upwardly protrudes relative to the outer panel 103, and the outer panel 103 downwardly protrudes relative to the inner panel 102. In the upwardly-protruding part of the inner panel 102, the upper arm pivot 106 configured to support the upper arm 93 is provided so as to extend in the vehicle length direction. The upper arm pivot 106 is inserted into a support sleeve 107 (see FIGS. 10 and 11) provided in the inner panel 102. A stiffener 108 (see FIGS. 10 and 11) is provided on an outer side of the support sleeve 107 in the vehicle width direction (at a position above the outer panel 103), and reinforces part of the inner panel 102 where the upper arm pivot 106 is provided. The reason why the upper arm pivot 106 is provided in the inner panel 102 is that the length of the upper arm 93 can be longer than that in the case where the upper arm pivot 106 is provided in the outer panel 103.

In a lower part of the inner panel 102, an inner panel front leg part 102a and an inner panel rear leg part 102b are provided so as to be branched and separated from each other in the vehicle length direction. In the lower part of the suspension tower reinforcement 104, a reinforcement front leg part 104a and a reinforcement rear leg part 104b are provided so as to be branched and separated from each other in the vehicle length direction. The reinforcement front leg part 104a is welded to the outer panel front leg part 103b, and the reinforcement rear leg part 104b is welded to the outer panel rear leg part 103c.

The inner panel front leg part 102a, the outer panel front leg part 103b, and the reinforcement front leg part 104a together form the front leg part 101a of the suspension tower 101. The inner panel rear leg part 102b, the outer panel rear leg part 103e, and the reinforcement rear leg part 104b together form the rear leg part 101b of the suspension tower 101.

The front leg part 101a and the rear leg part 101b of the suspension tower 101 are welded to the main frame 10 so as to be separated from each other in the vehicle length direction. Specifically, the inner panel front leg part 102a and the inner panel rear leg part 102b of the inner panel 102 are welded to an inner part of an upper surface of the main frame 10 in the vehicle width direction (to the inner panel 20 of the main frame 10) so as to be separated from each other in the vehicle length direction. The outer panel front leg part 103b and the outer panel rear leg part 103c, of the outer panel 103 are welded to an outer part of the upper surface of the main frame 10 in the vehicle width direction and to a part extending from the upper end to the lower end in the outer surface of the main frame 10 in the vehicle width direction (to the outer panel 21 of the main frame 10) so as to be separated from each other in the vehicle length direction. The reinforcement front leg part 104a and the reinforcement rear leg part 104b of the suspension tower reinforcement 104 are welded to the outer surface of the main frame 10 in the vehicle width direction (to the outer panel 21 of the main frame 10) so as to be separated from each other in the vehicle length direction. Thus, the lower part of the suspension tower 101 is not attached to the main frame 10 across the entirety of the lower part of the suspension tower 101 in the vehicle length direction, but a middle lower part of the suspension tower 101 in the vehicle length direction is not attached to the main frame 10. As described above, even if the lower part of the suspension tower 101 is attached to the main frame 10 at the front leg part 101a and the rear leg part 101b, the suspension tower 101 is, on the inner side in the vehicle width direction, attached to the main frame 10 at the inner panel front leg part 102a and the inner panel rear leg part 102b, and is, on the outer side in the vehicle width direction, attached to the main frame 10 at the outer panel front leg part 103b, the outer panel rear leg part 103c, the reinforcement front leg part 104a, and the reinforcement rear leg part 104b. Thus, the attachment strength of the suspension tower 101 to the main frame 10 can sufficiently withstand force received from the strut 96.

A plurality of recessed parts 126 (four recessed parts 126) (see FIGS. 6-9 and 20-22) are formed in part of the main frame 10 between the front leg part 101a and the rear leg part 101b (in the total of four parts which are a corner part formed between the upper surface of the main frame 10 and one of side surfaces of the main frame 10 in the vehicle width direction, a corner part between the upper surface of the main frame 10 and the other side surface of the main frame 10 in the vehicle width direction, a corner part formed between the lower surface of the main frame 10 and one of the side surfaces of the main frame 10 in the vehicle width direction, and a corner part formed between the lower surface of the main frame 10 and the other side surface of the main frame 10 in the vehicle width direction). The plurality of recessed parts 126 allow the main frame 10 to be easily compressed and deformed in the vehicle length direction at the recessed parts 126 upon the frontal collision of the vehicle 1 (particularly upon a full-wrap frontal collision of the vehicle 1). That is, a connection part of the main frame 10 and the suspension tower 101 (attachment part of the main frame 10 and the suspension tower 101) is typically less likely to be compressed and deformed. However, since the suspension tower 101 is attached to the main frame 10 at the front leg part 101a and the rear leg part 101b separated from each other in the vehicle length direction, the main frame 10 can be, at part thereof between the front leg part 101a and the rear leg part 101b, easily compressed and deformed in the vehicle length direction upon the frontal collision of the vehicle 1. In addition, since the recessed parts 126 are formed in the foregoing part, the main frame 10 can be more easily compressed and deformed in the vehicle length direction at the foregoing part. Note that the recessed parts 126 may be formed in any part of the main frame 10 between the front leg part 101a and the rear leg part 101b. The recessed parts 126 are not necessarily formed respectively at multiple positions, and the recessed part 126 may be formed at a single position.

The second cross-member 12 is provided at a position apart from the suspension tower 101 toward the front. In addition, the third cross-member 13 is provided at a position apart from the suspension tower 101 toward the rear.

The engine mount bracket 27 is provided so as to be, in the vehicle length direction, apart from the connection part of the main frame 10 and the suspension tower 101, a connection part of the main frame 10 and the second cross-member 12 (connection part of the main frame 10 and the cross-member bracket 23), and a connection part of the main frame 10 and the third cross-member 13 (connection part of the main frame 10 and the cross-member bracket 24). In addition, the engine mount bracket 27 is welded to part of the inner surface of the main frame 10 in the vehicle width direction (to part of the inner panel 20 of the main frame 10) between the second and third cross-members 12, 13.

Providing the engine mount bracket 27 apart from each of the foregoing connection parts in the vehicle length direction includes providing the engine mount bracket 27 apart from each of the foregoing connection parts in the vehicle length direction at the same height position of the main frame 10. Referring to, e.g., FIG. 9, the engine mount bracket 27 is forwardly inclined toward the bottom at a front end thereof. At a height position in the upper part of the main frame 10, an upper front end part of the engine mount bracket 27 is positioned apart from the rear leg part 101b of the suspension tower 101 in the vehicle length direction. A lower front end part of the engine mount bracket 27 is positioned apart from the rear leg part 101b in the vertical direction. That is, the engine mount bracket 27 is, at the front end thereof, forwardly inclined toward the bottom such that a clearance having a predetermined width is formed between the engine mount bracket 27 and the suspension tower 101 (rear leg part 101b). As will be described later, the main frame 10 is, at the foregoing clearance, compressed and deformed in the vehicle length direction.

In the present embodiment, the engine mount bracket 27 is attached to part of the main frame 10 between the suspension tower 101 and the third cross-member 13. In such a case, since the engine 32 can be arranged at a position relatively closer to the rear in a front part of the main frame 10, timing of backward movement of the engine 32 upon the front collision of the vehicle 1 can be delayed. As a result, the amount of energy absorbed by the compression deformation of the front part of the main frame 10 before the engine 32 begins to move backward can be increased.

The engine mount bracket 27 may be attached to part of the main frame 10 between the suspension tower 101 and the second cross-member 12. In such a case, it is also preferred that the engine mount bracket 27 is attached to the main frame 10 so as to be apart from the connection part of the main frame 10 and the suspension tower 101, the connection part of the main frame 10 and the second cross-member 12, and the connection part of the main frame 10 and the third cross-member 13 in the vehicle length direction. Note, however, that the engine 32 is likely to be arranged at a position relatively closer to the front in the front part of the main frame 10, and therefore the timing of the backward movement of the engine 32 upon the frontal collision of the vehicle 1 is advanced. As a result, the amount of energy absorbed by the compression deformation at the front part of the main frame 10 before the engine 32 begins to move backward is decreased. Thus, engineering for energy absorption is required, which takes into account the backward movement of the engine 32 having an unstable behavior.

Figure 25:
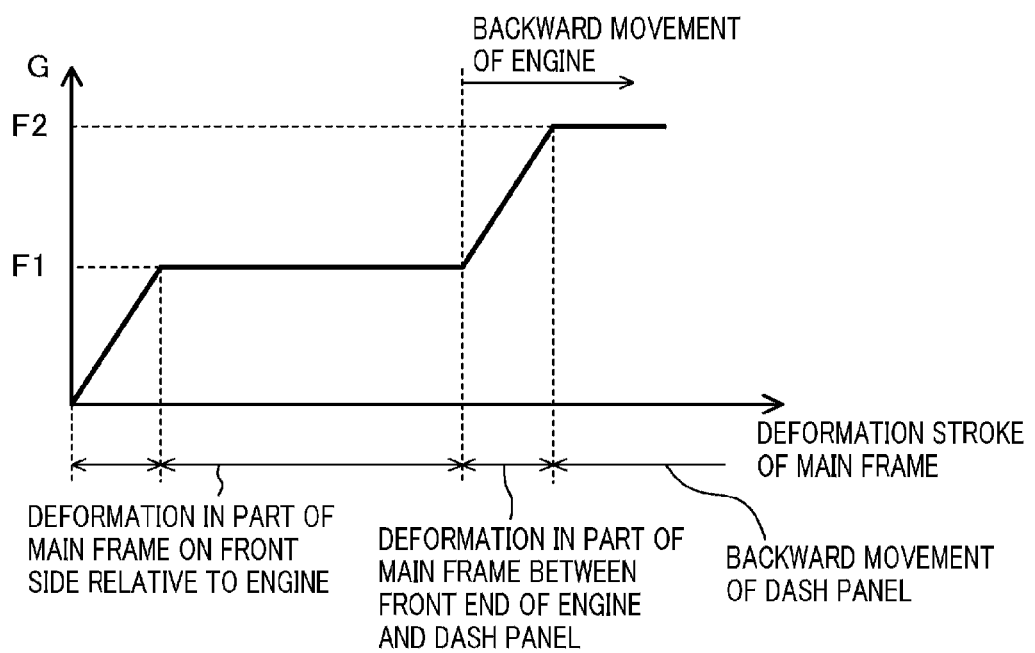
FIG. 25 is a graph illustrating a relationship between a compression deformation stroke (the amount of entry of an obstacle into the vehicle upon a frontal collision between the obstacle and the vehicle) and impact force G acting on a cabin upon the frontal collision of the vehicle.

Upon the full-wrap frontal collision of the vehicle 1, impact force toward the rear is applied to the entirety of the front bumper 5 and the first cross-member 11 in the vehicle width direction. Thus, referring to FIG. 25, impact force G acting on the cabin 3 is increased to F1.

Subsequently, each of the right and left main frames 10 is compressed and deformed in the vehicle length direction (length direction of the main frame 10) at part thereof between the first and second cross-members 11, 12. At this point, the impact force G is F1.

Then, each of the main frames 10 is compressed and deformed in the vehicle length direction at the following parts in the order described below: part of the main frame 10 between the second cross-member 12 and the suspension tower 101; part of the main frame 10 between the front leg part 101*a* and the rear leg part 101*b* of the suspension tower 101 (part of the main frame 10 where the recessed parts 126 are formed); part of the main frame 10 between the suspension tower 101 and the engine mount bracket 27; and part of the main frame 10 between the engine mount bracket 27 and the third cross-member 13 (this part includes the bump stopper 115). In parallel with the compression deformation of the main frame 10 at the foregoing parts, the engine 32 moves backward, and then the dash panel 29 is deformed toward the rear by the backwardly-moving engine 32 (the dash panel 29 moves backward while being deformed). When the engine 32 begins to move backward, the impact force G is increased from F1, and reaches F2 when the deformation (movement) of the dash panel 29 toward the rear begins due to the backward movement of the engine 32.

A value for F2 significantly varies depending on the amount of compression deformation of the main frame 10 in the vehicle length direction. A larger compression deformation amount results in a smaller value for F2. However, the various deformation preventing members preventing the compression deformation of the main frame 10 in the vehicle length direction upon the frontal collision of the vehicle 1, such as the second and third cross-members 12, 13, the suspension tower 101, and the engine mount bracket 27, are attached to part of the main frame 10 between the second and third cross-members 12, 13. If the bump stopper 115 is not compressed and deformed in the vehicle length direction in the foregoing configuration and arrangement, such a state is disadvantageous to the amount of compression deformation of the main frame 10 in the vehicle length direction.

In present embodiment, the stopper body 116 is the panel which is in the substantially U-shape as viewed in the cross section, and the upper opening thereof is not closed but opened. This allows the bump stopper 115 (stopper body 116) to be easily compressed and deformed in the vehicle length direction upon the frontal collision of the vehicle 1, and therefore is less likely to prevent the compression deformation of the main frame 10 in the vehicle length direction. As a result, the bump stopper 115 is not considered as the deformation preventing members. In addition, the recessed parts 125 are formed at the positions of the main frame 10 overlapping with the upper opening 116*a* in the vehicle length direction, and the front attachment part 116*c* of the stopper body 116 is positioned so as not to overlap with the engine mount bracket 27 in the vehicle length direction. Thus, it can be ensured that the main frame 10 can be more easily compressed and deformed in the vehicle length direction at the attachment part of the main frame 10 and the bump stopper 115 (at part of the main frame 10 between the engine mount bracket 27 and the third cross-member 13).

In the present embodiment, since the plurality of deformation preventing members are dispersively arranged in the vehicle length direction on the main frame 10 it is ensured that the main frame 10 is compressed and deformed in the vehicle length direction at part of the main frame 10 between adjacent ones of the deformation preventing members. That is, unlike the case where the plurality of deformation preventing members are arranged so as to overlap with each other in the vehicle length direction, the main frame 10 cannot be compressed and deformed at all in the vehicle length direction at the attachment part of each of the deformation preventing member and the main frame 10, but can be compressed and deformed to some extent. Particularly in the present embodiment, the front leg part 101*a* and the rear leg part 101*b* separated from each other in the vehicle length direction are provided in the lower part of the suspension tower 101. Lower parts of the front leg part 101*a* and the rear leg part 101*b* are attached to the main frame 10 so as to be separated from each other in the vehicle length direction, and the recessed part 126 is formed in part of the main frame 10 between the front leg part 101*a* and the rear leg part 101*b*. Thus, it is ensured that the main frame 10 is compressed and deformed in the vehicle length direction at part of the main frame 10 between the front leg part 101*a* and the rear leg part 101*b*. The formation of the notch 27*d* allows the engine mount bracket 27 to be easily compressed and deformed in the vehicle length direction. In addition, in combination with the elongated hole 128 formed in the main frame 10, it is likely that the main frame 10 is compressed and deformed in the vehicle length direction at the attachment part of the main frame 10 and the engine mount bracket 27. Thus, the total compression deformation at multiple positions allows the following: the amount of collision energy absorbed upon the frontal collision of the vehicle 1 can be ensured; and an instantaneous action of excessive impact force on the cabin 3 can be reduced. In addition, since the plurality of points at each of which it is ensured that the main frame 10 is compressed and deformed in the vehicle length direction are dispersively positioned, the impact force G can be easily controlled.

As in the full-wrap frontal collision, the main frame 10 on a collided side is compressed and deformed in the vehicle length direction upon an offset frontal collision of the vehicle 1. However, referring to FIG. 26, the second and third cross-members 12, 13, the engine 32, the front wheel drive shaft 47, etc. do not move straight toward the rear, and such components on the collided side greatly moves toward the rear as compared to the components on a non-collided side. There is a possibility that the front wheel 6 (hub 50) on the collided side pushes the main frame 10 on the collided side toward the inner side in the vehicle width direction. Note that a reference numeral "200" in FIG. 26 represents an obstacle collided with the vehicle 1 at the front thereof.

Upon the offset frontal collision of the vehicle 1, great backward force is generated at the narrow part 10*a* of the main frame 10 on the collided side, and, on the other hand, counterforce against the backward movement of the narrow part 10*a* is generated at the wide part 10*b*. In addition, the narrow part 10*a* and the wide part 10*b* are displaced from each other in the vehicle width direction. Thus, in combination with the pressing force of the hub 50, the narrow part 10*a* tends to be, starting at the connection part of the narrow part 10*a* and the widened part 10*e*, bent toward the outer side in the vehicle width direction. If the narrow part 10*a* is bent at such a position, the main frame 10 cannot be effectively compressed and deformed in the vehicle length direction at the narrow part 10*a*, and a collision energy absorption function cannot be sufficiently fulfilled. Thus, prevention of the bending of the narrow part 10*a* is required during the entire period of the offset frontal collision.

Figure 26:
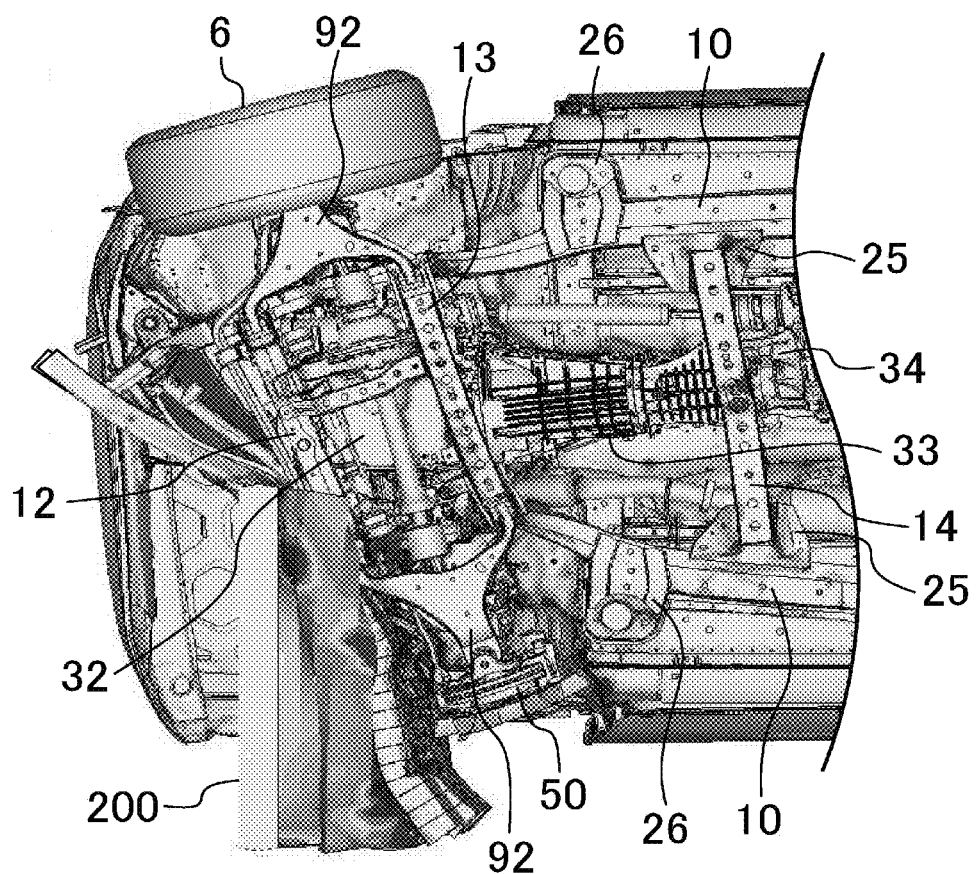
FIG. 26 is a bottom view illustrating a state in a front part of the vehicle upon an offset frontal collision of the vehicle.

Referring to FIG. 26, a behavior upon the offset frontal collision in the present embodiment will be described.

In the present embodiment, the width (cross-sectional area) in part of the main frame 10 from the widened part 10*e* to the wide part 10*b* is gradually increased, and the width (cross-sectional area) is the maximum in the connection part of the wide part 10*b* and the fourth cross-member 14 and the vicinity thereof. In addition, the connection part of the fourth cross-member 14 and the wide part 10*b* of the main frame 10 is reinforced by the large gusset 25. As a result since the stiffness in the trapezoidal part formed by the widened part 10*e* and the third and fourth cross-members 13, 14 is enhanced, the deformation/displacement of the widened part 10*e* toward the inner or outer side in the vehicle width direction due to the backward force of the narrow part 10a can be reduced, and the bending of the main frame 10 due to such displacement can be reduced.

The narrow part 10a (hereinafter referred to as a "collided-side narrow part 10a") of the main frame 10 on the collided side is, from a front end thereof, compressed and deformed in the vehicle length direction. When the front wheel 6 (hub 50) pushed by the obstacle 200 moves backward, the collided-side narrow part 10a tends to be outwardly bent in the vehicle width direction at the lower arm 92. In such a state, the strong frame-shaped member formed by the second and third cross-members 12, 13 and the right and left lower arms 92 reduces the bending of the collided-side narrow part 10a. That is, a load against bending force of the collided-side narrow part 10a is transmitted to the narrow part 10a of the main frame 10 on the non-collided side through the foregoing frame-shaped member, and then is dispersed. In such a manner, the bending force acting on the collided-side narrow part 10a is reduced.

Subsequently, the front wheel 6 (hub 50) moving backward comes into collision with a front part of the cab-mount bracket 26 and then is stopped. Thus, the bending of the collided-side narrow part 10a due to the backward movement of the front wheel 6 (hub 50) is effectively reduced.

Subsequently, the obstacle 200 comes into collision with one side of a front part of the engine 32. In such a state, the engine 32, the transmission 33, and the power transfer unit 34 (such components are joined together, and such a joined body is hereinafter referred to as a "power unit") tends to rotate, on a rear end side thereof, so as to be displaced to the non-collided side. As long as such rotation is not reduced, the power unit cannot prevent an entry of the obstacle 200. Thus, in such a state, the collided-side narrow part 10a is susceptible to the absorption of the collision load, resulting in the bending tendency of the main frame 10 due to the displacement of the narrow part 10a and the wide part 10b in the vehicle width direction. Since the power transfer unit 34 is joined onto the fourth cross-member 14 through the mount, the fourth cross-member 14 outwardly pushes the non-collided-side main frame 10 in the vehicle width direction due to the load displacing the rear end side of the power unit to the non-collided side, and attempts to outwardly bend the main frame 10 in the vehicle width direction. In the present embodiment, since the fourth cross-member 14 is joined to a maximum cross-sectional part of the main frame 10 where bending strength is the maximum, the main frame 10 is not bent due to the foregoing load. Thus, the rotation of the power unit is reduced, and the power unit and the collided-side narrow part 10a together absorb the collision load. Consequently, the bending of the collided-side narrow part 10a is reduced. In addition, the narrow part 10a is, from a front end down to a rear end thereof, compressed and deformed in the vehicle length direction, and therefore the energy absorption amount is effectively increased.

According to the foregoing, upon the offset frontal collision, the collision energy can be absorbed by the compression deformation of the main frame 10 on the collided side, and the impact force G acting on the cabin 3 can be reduced.

The present invention is not limited to the foregoing embodiment, and replacements can be made without departing from the main features of the invention.

For example, the recessed parts 125 are not necessarily formed at the positions of the main frame 10 overlapping with the upper opening 116a of the stopper body 116 in the vehicle length direction.

The suspension tower 101 is not necessarily branched into the front leg part 101a and the rear leg part 101b at the lower part thereof, and the suspension tower 101 may be attached to the main frame 10 across the entirety of a lower end part of the suspension tower 101 in the vehicle length direction. In the case where the suspension tower 101 is branched into the front leg part 101a and the rear leg part 101b at the lower part thereof, the recessed part 126 is not necessarily formed in part of the main frame 10 between the front leg part 101a and the rear leg part 101b.

The foregoing embodiment has been set forth merely for purposes of preferred examples in nature, and the scope of the invention is not limited to such an embodiment. The scope of the present invention is defined by the appended claims, and modifications and changes within the equivalent range of the claims are regarded to be within the scope of the present invention.

INDUSTRIAL APPLICABILITY

The present invention is useful for the bump stopper configured to contact the arm (lower arm) of the front wheel suspension device of the vehicle including the chassis frame and restrict the upward movement of the arm.

DESCRIPTION OF REFERENCE CHARACTERS

1 Vehicle
9 Chassis Frame
10 Main Frame
13 Third Cross-Member (Cross-Member Extending in Vehicle Width Direction in Vicinity of Front Wheel Suspension Device) (Cross-Member to which Rear Base End Part of Lower Arm is Attached)
27 Engine Mount Bracket
90 Front Wheel Suspension Device
92 Lower Arm
92b Rear Base End Part
115 Bump Stopper
116 Stopper Body
116a Upper Opening
116b Lower Opening
116c Front Attachment Part
116d Rear Attachment Part
117 Closing Member
125 Recessed Part (Weak Part)

The invention claimed is:

1. A bump stopper attached to a main frame of a chassis frame of a vehicle extending in a vehicle length direction, contacting an arm of a front wheel suspension device of the vehicle, and restricting upward movement of the arm, the bump stopper comprising:
 a stopper body attached to an outer surface of the main frame in a vehicle width direction so as to protrude toward an outer side in the vehicle width direction,
 wherein the stopper body is a panel which is, as viewed in a cross section along a horizontal direction, formed in a bag shape having an opening on an inner side in the vehicle width direction and formed so as to have openings at upper and lower ends, and the stopper body is attached to the outer surface of the main frame in the vehicle width direction at front and rear attachment parts which are end parts of the panel positioned at sides of the opening on the inner side in the vehicle width direction such that the end parts are apart from each other in the vehicle length direction,
 a contact member contacting the arm is attached to the stopper body so as to be positioned in a vicinity of a lower opening which is the opening at the lower end of the panel, and at a position of the main frame overlapping, in the vehicle length direction, with an upper opening which is the opening at the upper end of the panel, a weak part configured to facilitate deformation of the main frame in the vehicle length direction upon a frontal collision of the vehicle is provided.

2. The bump stopper of claim 1, wherein
the contact member is attached to the stopper body through a closing member covering the lower opening of the stopper body.

3. The bump stopper of claim 1, wherein
an amount of outward protrusion of the stopper body from the main frame in the vehicle width direction is increased toward a bottom of the stopper body.

4. The bump stopper of claim 1, wherein
the chassis frame includes a cross-member extending in the vehicle width direction in a vicinity of the front wheel suspension device,
an engine mount bracket is attached to the main frame,
the cross-member and the engine mount bracket are attached to the main frame so as to be apart from each other on the main frame, and
one or both of the front and rear attachment parts of the stopper body is attached to the main frame at a position which does not overlap with the cross-member and the engine mount bracket in the vehicle length direction.

5. The bump stopper of claim 4, wherein
one of the front and rear attachment parts of the stopper body is attached to the main frame at the position which does not overlap with the cross-member and the engine mount bracket in the vehicle length direction, and
the other one of the front and rear attachment parts of the stopper body overlaps with the cross-member in the vehicle length direction and is attached to the main frame and the cross-member.

6. The bump stopper of claim 1, wherein
the arm is branched apart in the vehicle length direction at a base end part thereof,
the chassis frame includes a cross-member attached to a rear base end part of the arm and extending in the vehicle width direction,
an engine mount bracket is attached to an inner surface of the main frame in the vehicle width direction so as to be apart from the cross-member in front thereof,
the rear attachment part of the stopper body is attached to the outer surface of the main frame in the vehicle width direction at a position overlapping with the cross-member in the vehicle length direction, and
the front attachment part of the stopper body is attached to the outer surface of the main frame in the vehicle width direction at a position between the engine mount bracket and the cross-member in the vehicle length direction.

7. The bump stopper of claim 1, wherein
the front and rear attachment parts of the stopper body are attached to parts extending an upper end to a lower end at the outer surface of the main frame in the vehicle width direction.

8. A bump stopper contacting an arm of a front wheel suspension device of a vehicle and restricting upward movement of the arm, the bump stopper comprising:
a stopper body formed in a substantially U-shape as viewed in a cross section along a horizontal direction,
wherein the stopper body is attached to a main frame of the vehicle extending in a vehicle length direction, at end parts of the U-shape as viewed in the cross section,
an upper opening is formed between an upper end part of the stopper body and the main frame, and
a weak part is provided at a position of the main frame overlapping with the upper opening of the stopper body in the vehicle length direction.

9. The bump stopper of claim 8, wherein
a lower opening is formed between a lower end part of the stopper body and the main frame.

10. The bump stopper of claim 9, wherein
the lower opening is closed by a closing member.

11. The bump stopper of claim 10, wherein
a contact member contacting the arm is attached to the closing member.

12. The bump stopper of claim 8, wherein
the stopper body protrudes from the main frame in a vehicle width direction, and
an amount of protrusion of the stopper body from the main frame is increased toward a bottom of the stopper body.

13. The bump stopper of claim 8, wherein
an engine mount bracket and a cross-member extending in a vehicle width direction in a vicinity of the front wheel suspension device are attached to the main frame,
the cross-member and the engine mount bracket are attached to the main frame so as to be apart from each other on the main frame, and
one or both of the end parts of the U-shape of the stopper body is attached to the main frame at a position which does not overlap with the cross-member and the engine mount bracket in the vehicle length direction.

14. The bump stopper of claim 13, wherein
one of the end parts of the U-shape of the stopper body is attached to the main frame at the position which does not overlap with the cross-member and the engine mount bracket in the vehicle length direction, and
the other one of the end parts of the U-shape of the stopper body overlaps with the cross-member in the vehicle length direction, and is attached to the main frame and the cross-member.

15. The bump stopper of claim 8, wherein
the arm is branched apart in the vehicle length direction at a base end part thereof,
a rear base end part of the arm and a cross-member extending in a vehicle width direction are attached to the main frame,
an engine mount bracket is attached to the main frame so as to be part from the cross-member in front thereof,
a rear end part of the end parts of the U-shape of the stopper body is attached to the main frame at a position overlapping with the cross-member in the vehicle length direction, and
a front end part of the end parts of the U-shape of the stopper body is attached to the main frame at a position between the engine mount bracket and the cross-member in the vehicle length direction.

16. The bump stopper of claim 8, wherein
the end parts of the U-shape of the stopper body are attached to parts extending an upper end to a lower end at an outer surface of the main frame in a vehicle width direction.

* * * * *